US011447416B2

(12) United States Patent
Davis et al.

(10) Patent No.: US 11,447,416 B2
(45) Date of Patent: Sep. 20, 2022

(54) STRENGTHENED COVERS FOR ELECTRONIC DEVICES

(71) Applicant: Apple Inc., Cupertino, CA (US)

(72) Inventors: Richard A. Davis, Cupertino, CA (US); Christopher D. Jones, Los Gatos, CA (US)

(73) Assignee: APPLE INC., Cupertino, CA (US)

(*) Notice: Subject to any disclaimer, the term of this patent is extended or adjusted under 35 U.S.C. 154(b) by 543 days.

(21) Appl. No.: 16/537,425

(22) Filed: Aug. 9, 2019

(65) Prior Publication Data
US 2020/0199018 A1 Jun. 25, 2020

Related U.S. Application Data

(60) Provisional application No. 62/783,162, filed on Dec. 20, 2018.

(51) Int. Cl.
B32B 15/04 (2006.01)
B32B 17/06 (2006.01)
C03C 21/00 (2006.01)
G06F 1/16 (2006.01)

(52) U.S. Cl.
CPC .......... C03C 21/002 (2013.01); G06F 1/1601 (2013.01); G06F 1/163 (2013.01); G06F 1/1656 (2013.01)

(58) Field of Classification Search
CPC .................................... C03C 21/002
USPC .............................. 428/426, 410
See application file for complete search history.

(56) References Cited

U.S. PATENT DOCUMENTS

| | | | |
|---|---|---|---|
| 3,287,200 A | 11/1966 | Hess et al. | |
| 8,652,639 B2 | 2/2014 | Chu et al. | |
| 9,187,358 B2 | 11/2015 | Luo et al. | |
| 9,221,715 B2 | 12/2015 | Rogers et al. | |
| 9,292,634 B2 | 3/2016 | Ahmed et al. | |
| 9,725,359 B2 | 8/2017 | Weber | |
| 9,790,128 B2 | 10/2017 | Garner et al. | |
| 9,886,062 B2 | 2/2018 | Qian et al. | |
| 9,946,302 B2 | 4/2018 | Franklin et al. | |
| 10,071,933 B2 | 9/2018 | Wang et al. | |
| 10,206,298 B2 | 2/2019 | Memering et al. | |
| 10,781,135 B2 | 9/2020 | Weber et al. | |
| 2005/0184637 A1 | 8/2005 | Sugawara et al. | |
| 2011/0154861 A1 | 6/2011 | Kishimoto et al. | |
| 2012/0194974 A1* | 8/2012 | Weber ................... | C03C 21/002 361/679.01 |
| 2012/0236477 A1* | 9/2012 | Weber ................... | B32B 17/06 361/679.01 |

(Continued)

FOREIGN PATENT DOCUMENTS

| | | |
|---|---|---|
| CN | 1491911 | 4/2004 |
| CN | 102131740 | 7/2011 |

(Continued)

Primary Examiner — Lauren R Colgan
(74) Attorney, Agent, or Firm — Brownstein Hyatt Farber Schreck, LLP

(57) ABSTRACT

Methods for chemically strengthening a cover for an electronic are disclosed. The methods include removing material from a mounting surface of the cover to counteract warping of the mounting surface due to ion exchange. The chemically strengthened covers have a high bend strength and allow a strong seal to be formed between the cover and an enclosure component.

18 Claims, 13 Drawing Sheets

(56) References Cited

U.S. PATENT DOCUMENTS

| | | | |
|---|---|---|---|
| 2012/0236526 A1* | 9/2012 | Weber | C03C 21/002 65/30.14 |
| 2013/0122254 A1 | 3/2013 | Liang | |
| 2013/0122260 A1 | 5/2013 | Liang | |
| 2014/0034374 A1 | 2/2014 | Cornejo et al. | |
| 2014/0162029 A1* | 6/2014 | Takeuchi | C03B 23/0235 65/30.14 |
| 2015/0044445 A1 | 2/2015 | Garner et al. | |
| 2015/0274585 A1* | 10/2015 | Rogers | C03C 21/002 65/30.14 |
| 2016/0214889 A1* | 7/2016 | Garner | C03C 3/078 |
| 2017/0334769 A1 | 11/2017 | Luzzato et al. | |
| 2017/0334770 A1* | 11/2017 | Luzzato | C03C 21/008 |
| 2019/0023611 A1* | 1/2019 | Luzzato | C03C 21/002 |
| 2019/0161401 A1* | 5/2019 | Kuang | C03C 19/00 |
| 2019/0330103 A1* | 10/2019 | Ozeki | C03B 23/0302 |
| 2021/0139371 A1 | 5/2021 | Luzzato et al. | |

FOREIGN PATENT DOCUMENTS

| | | |
|---|---|---|
| CN | 102388003 | 3/2012 |
| CN | 102612500 | 7/2012 |
| CN | 103261112 | 8/2013 |
| CN | 103391903 | 11/2013 |
| CN | 103476727 | 12/2013 |
| CN | 103748047 | 4/2014 |
| CN | 104144877 | 11/2014 |
| CN | 105683118 | 6/2016 |
| CN | 105873871 | 8/2016 |
| CN | 106061913 | 10/2016 |
| CN | 106164004 | 11/2016 |
| CN | 106380087 | 2/2017 |
| CN | 106673458 | 5/2017 |
| CN | 107117810 | 9/2017 |
| JP | 2000233949 | 8/2000 |
| JP | 2004510012 | 4/2004 |
| JP | 2005298312 | 10/2005 |
| JP | 2009234856 | 10/2009 |
| JP | 2014510012 | 4/2014 |
| JP | 2015006959 | 1/2015 |
| TW | 201819327 | 6/2018 |
| WO | WO2015/031151 | 3/2015 |
| WO | WO2015/057552 | 4/2015 |
| WO | WO2015130494 | 9/2015 |
| WO | WO2015/146169 | 10/2015 |

\* cited by examiner

STRENGTHENED COVERS FOR ELECTRONIC DEVICES

CROSS-REFERENCE TO RELATED APPLICATION(S)

This application is a non-provisional patent application of and claims the benefit of U.S. Provisional Patent Application No. 62/783,162, filed Dec. 20, 2018, and titled "Strengthened Covers for Electronic Devices," the disclosure of which is hereby incorporated by reference herein in its entirety.

FIELD

The described embodiments relate generally to chemically strengthened covers for electronic devices and related methods. More particularly, embodiments described herein relate to glass covers which are processed using a combination of chemical strengthening and material removal in order to mitigate warping or distortion of a mounting surface of the cover.

BACKGROUND

Conventional covers for portable electronic devices may be made of glass. Such conventional glass covers may be chemically strengthened through ion exchange. For example, chemical strengthening can improve the impact resistance of the glass cover.

However, some conventional glass covers may warp during chemical strengthening. Warpage of the cover can make it more difficult to form a seal between the glass cover and another part of the electronic device housing. The tendency for warpage can increase with increasing amounts of chemical strengthening.

SUMMARY

Aspects of the following disclosure relate to methods for chemically strengthening a cover for an electronic device. In embodiments, the cover defines a mounting surface that forms a seal with an enclosure component of the electronic device. In embodiments, the cover has a three-dimensional (3D) shape that includes a flange which defines the mounting surface.

The cover may be formed of an ion-exchangeable material, such as a glass. In some embodiments, the methods include at least two ion-exchange operations and an intermediate operation of locally removing material from the mounting surface of the cover. The operation of locally removing material from the mounting surface may at least partially counteract warping of the cover due to the preceding ion-exchange operation. The following ion-exchange operation can provide additional strength to the cover while retaining mounting surface flatness sufficient to allow the seal to be formed between the cover and the enclosure component.

A chemically strengthened cover as described herein may be included in a cover assembly of the electronic device. For example, a chemically strengthened glass cover or glass ceramic cover may serve as one component of a cover assembly. The cover assembly may also include one or more coating layers or other components.

The disclosure provides a method comprising placing a glass cover in a first ion-exchange bath to form a first ion-exchanged layer, the glass cover defining a central portion and a mounting surface at least partially surrounding the central portion. The method may further comprise removing the glass cover from the first ion-exchange bath. In addition, the method comprises removing material from the mounting surface, thereby locally reducing a depth of the first ion-exchanged layer along the mounting surface. After the operation of removing material from the mounting surface, the method further comprises placing the glass cover in a second ion-exchange bath to form a second ion-exchanged layer within the first ion-exchanged layer, thereby producing a compressive stress layer along the mounting surface. The glass cover is then removed from the second ion-exchange bath.

Additional aspects of the disclosure relate to chemically strengthened covers produced by the methods described herein. In some cases, the chemically strengthened covers have a mounting surface that is flat to within a tolerance. In some embodiments, the chemically strengthened covers may have an ion-exchanged layer and a compressive stress layer whose properties vary along one or more surfaces of the cover. For example, the properties of the compressive stress layer may vary along the mounting surface. In addition, the properties of the compressive stress layer may vary between the mounting surface and one or more surfaces of a central portion of the cover. A tensile stress layer may also be present within the glass cover and be located inward from the compressive stress layer.

The disclosure also provides an electronic device comprising an enclosure component defining a first mounting surface, a display, and a glass cover positioned over the display. The glass cover comprises a central portion and a flange at least partially surrounding the central portion. The flange defines a first segment extending along a first side of the central portion and defining a first region of a second mounting surface, a second segment extending along a second side of the central portion and defining a second region of the second mounting surface, and a corner segment extending from the first segment to the second segment and defining a third region of the second mounting surface. The glass cover further comprises a compressive stress layer having a first depth at the first region and a second depth, greater than the first depth, at the third region.

The disclosure further provides a strengthened glass cover for an electronic device, comprising a central portion, a mounting surface at least partially surrounding the central portion, and a compressive stress layer. The compressive stress layer has a first depth along a first region of the mounting surface and a second depth, greater than the first depth, along a second region of the mounting surface.

BRIEF DESCRIPTION OF THE DRAWINGS

The disclosure will be readily understood by the following detailed description in conjunction with the accompanying drawings, wherein like reference numerals designate like elements.

Figure 1A:
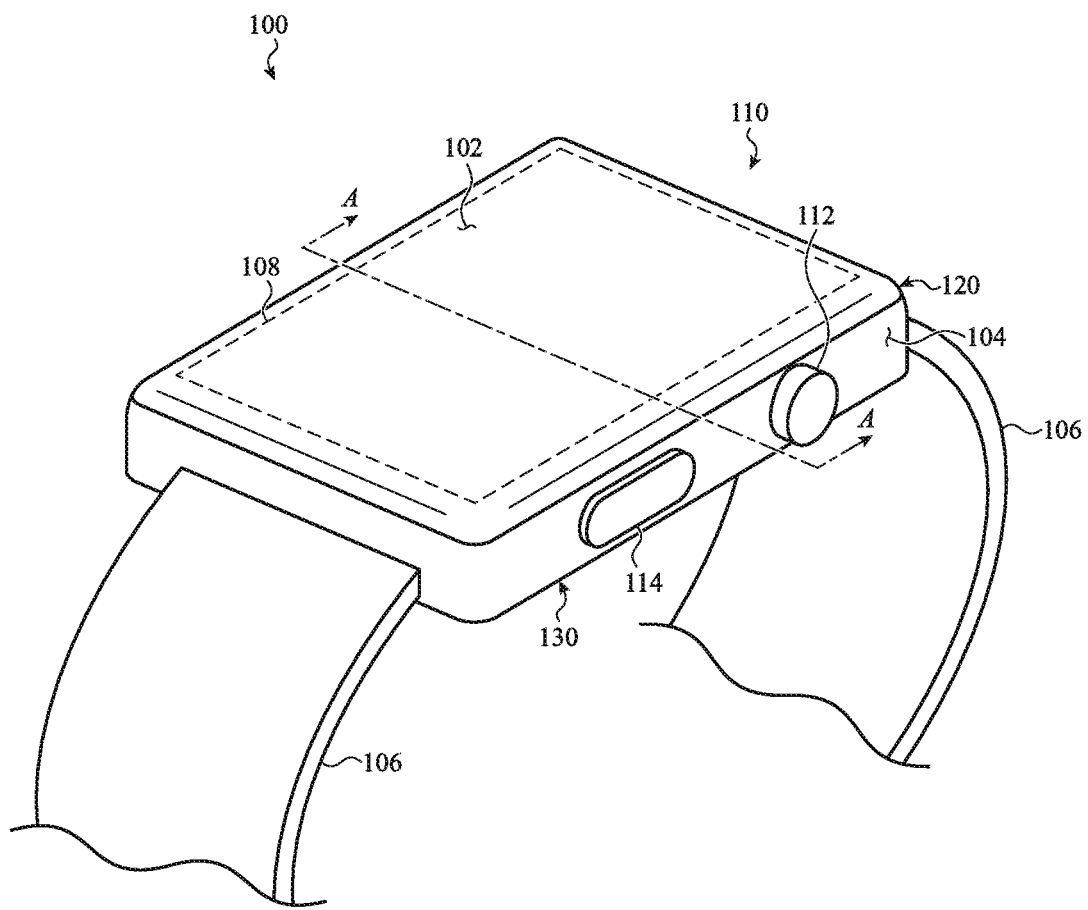
FIG. 1A depicts a perspective view of an example electronic device including a strengthened cover.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Aspects of the following disclosure relate to methods for chemically strengthening a cover for an electronic device. In some embodiments, the cover has a mounting surface that is coupled to a corresponding mounting surface of another component of the electronic device (e.g., an enclosure component). The interface between the mounting surfaces may form a seal to prevent ingress of liquids, debris, or other contaminants into an interior volume of the electronic device. In some cases, the mounting surface of the chemically strengthened cover is sufficiently flat to allow formation of the seal while also maintaining a desired level of bend strength.

The mounting surface may be defined by a peripheral portion of the cover. The peripheral portion of the cover may further define a flange (or flange portion). In addition, the peripheral portion of the cover may have a reduced thickness as compared to a central portion of the cover.

In some embodiments, chemically strengthening the cover through a first ion-exchange operation warps the cover such that the mounting surface of the cover is not sufficiently flat to form a good seal against the enclosure component. In order to counteract warpage of the mounting surface, material may be removed from the mounting surface following the first ion-exchange operation and before a subsequent ion-exchange operation. The operation of removing material from the mounting surface may improve the flatness or planarity of the mounting surface by improving the overall balance of internal stresses in the cover. Removal of material may also serve to physically flatten a mounting surface that has become distorted or warped during strengthening or other processing. A second ion-exchange operation may then be used to further chemically strengthen the cover and obtain the desired strength. The ion exchange in the second ion-exchange operation may produce an ion-exchanged layer that is shallower than that resulting from the first ion-exchange operation. Notably, by removing material from the mounting surface between the first and second ion-exchange operations, the negative impact of the two ion-exchange operations on the flatness of the cover may be mitigated or eliminated, thereby producing a cover of sufficient flatness to form an adequate seal while maintaining some or all of the additional strength afforded by the dual ion-exchange operation.

In some cases, material is removed locally from the mounting surface, rather than being removed uniformly from the entirety of the mounting surface. For example, a greater amount of material may also be removed from a first region of the mounting surface than from a second region of the mounting surface. In addition, the amount of material removed from the mounting surface may be greater than the amount of material removed from another surface of the cover. For example, a greater amount of material may be removed from an inner surface of a peripheral portion of the cover which defines the mounting surface than from an inner surface of a central portion of the cover.

In some embodiments, the cover may not warp significantly during the first ion exchange operation, but removal of material from the mounting surface prior to the second ion-exchange operation may provide other benefits. For example, if a peripheral portion of the cover is thin relative to a central portion of the cover, symmetric chemical strengthening may produce a higher central tension in the peripheral portion than in the central portion. Removal of material from the mounting surface can decrease the overall depth of the compressive stress layer along the mounting surface and therefore help to prevent the central tension in the peripheral portion of the cover from exceeding specified levels.

Additional aspects of the disclosure relate to chemically strengthened covers. In embodiments, the methods described herein (including locally removing material from a mounting surface between two ion-exchange operations) produce an ion-exchanged layer whose properties, such as depth, vary along the mounting surface of the cover. In addition, a compressive stress layer formed within the ion-exchanged layer may vary in properties such as depth and surface compressive stress along the mounting surface. Further, the properties of the ion-exchanged layer and the compressive stress layer along a region of the mounting surface may differ from those along other surfaces of the cover, such as an exterior surface of a central region of the cover.

These and other embodiments are discussed below with reference to FIGS. 1A-12. However, those skilled in the art will readily appreciate that the detailed description given herein with respect to these figures is for explanatory purposes only and should not be construed as limiting.

FIG. 1A depicts an example electronic device 100 including a strengthened cover 120. As shown in FIG. 1A, the electronic device 100 includes a housing 110, which includes a cover 120 and an enclosure component 130. The cover 120 may define at least a portion of a front exterior surface 102 of the electronic device 100. The enclosure component 130 defines at least a portion of a side exterior surface 104 of the electronic device 100.

The cover 120 is positioned over a display 108 (edges of display shown with broken lines) that is positioned at least partially within the enclosure component 130 of the housing 110. The cover 120 may define a window or other region transparent to visible light for viewing the display 108. The cover 120 may also be integrated with or coupled to a touch sensor. The touch sensor may be configured to detect or estimate a location of a touch event along the front exterior surface 102 of the electronic device. In additional embodiments, the cover 120 may be integrated with or coupled to a force sensor. The force sensor may be configured to detect amounts or magnitudes of force associated with touch events along the front exterior surface 102.

In some embodiments, the cover 120 comprises a glass, a glass ceramic, or a combination thereof. In embodiments, the glass or glass ceramic is ion-exchangeable, allowing chemical strengthening of the cover. By the way of example, the cover 120 may be a glass cover or a glass ceramic cover.

In additional embodiments, the cover 120 of FIG. 1A may be a cover assembly formed from multiple components, one of which is an ion-exchangeable cover component. For example, the cover 120 may include a glass or a glass ceramic cover which serves as a component of the cover assembly. The glass or glass ceramic cover may define a mating surface which can be used to form a seal with another component of the electronic device, such as enclosure component 132. In some cases, the glass or glass ceramic cover may extend over a portion or the entirety of the display 108. The glass or glass ceramic cover may be transparent to visible light, translucent, or a combination thereof. Other components of the cover 120 may include a surface coating, such as a hydrophobic or oleophobic coating and/or a decorative coating, along a surface of the glass or glass ceramic cover.

Generally, the cover 120 or cover component includes an ion-exchangeable glass, an ion-exchangeable glass ceramic, or a combination thereof. The ion-exchangeable glass or glass ceramic may be a metal oxide-based material such as a silica-based material. In embodiments, the cover includes an aluminosilicate glass or an aluminosilicate glass ceramic. An aluminosilicate glass or glass ceramic may include monovalent or divalent ions which compensate for charges due to replacement of silicon ions by aluminum ions. Suitable monovalent ions include, but are not limited to, alkali metal ions such as $Li^+$, $Na^+$, or $K^+$. Suitable divalent ions include alkaline earth ions such as $Ca^{2+}$ or Mg. The description of cover 120 is generally applicable to other covers as described herein including, but not limited to, covers 220a, 220b, 320, 420, 920, and 1020.

The enclosure component 130 may comprise a metal, a ceramic, a glass, a glass ceramic, or a combination thereof.

In addition, the enclosure component may define one or more openings. As shown in FIG. 1A, the one or more openings may be configured to surround input devices such as a crown 112 and a button 114.

The electronic device 100 may include a crown 112 having a cap, head, protruding portion, or component(s) positioned along the side exterior surface 104 of the electronic device. At least a portion of the crown 112 may protrude from the enclosure component 130. The crown may be configured to receive rotational input, translational/axial input, or a combination thereof from a used.

The electronic device 100 may include other inputs, switches, buttons or the like in addition to or instead of the crown 112. As shown in FIG. 1A, the electronic device 100 includes a button 114. In the example of FIG. 1A, the button 114 is movable. In additional examples, the button may be fixed but responsive to a touch event.

As depicted in FIG. 1A, the electronic device 100 is a wearable electronic device and includes a band 106 which is coupled to enclosure component 130. The band 106 may be configured to attach the electronic device 100 to a user. For example, the band may be fastened around the wrist or the arm of a user. In other cases, the electronic device may be a portable electronic device such as a mobile telephone, a computing device, or other form of electronic device.

Figure 1B:
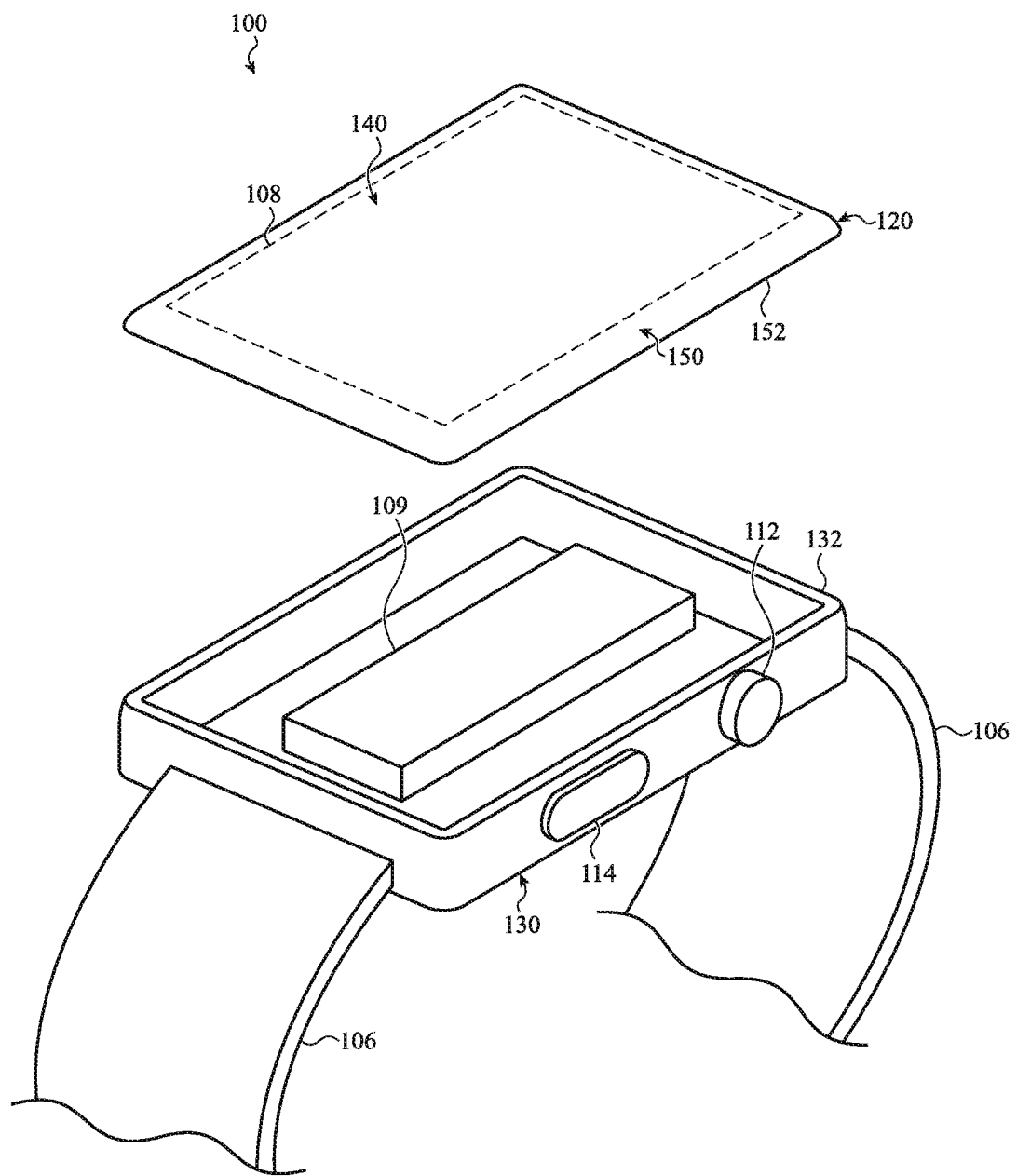
FIG. 1B depicts an exploded view of the electronic device of FIG. 1A.

FIG. 1B depicts an example exploded view of the electronic device 100 of FIG. 1A. The cover 120 includes a central portion 140 and a flange portion 150, with flange portion 150 at least partially surrounding central portion 140. The flange portion 150 has an end 152. The flange portion may alternately be referred to as a side portion of cover 120. The enclosure component 130 may define a mating surface 132 which mates with the end 152 of the flange portion 150. A glass or glass ceramic cover component of the cover 120 may have a similar geometry and define a central portion and flange or end portion. The crown 112, the button 114, and the band 106 shown in FIG. 1B may be similar to those shown in FIG. 1A and for brevity that description is not repeated here.

As discussed with respect to FIG. 1A, the electronic device 100 includes a display 108. The display 108 may be coupled to the cover 120. The display 108 may include a liquid-crystal display (LCD), a light-emitting diode, an organic light-emitting diode (OLED) display, an active layer organic light emitting diode (AMOLED) display, an organic electroluminescent (EL) display, an electrophoretic ink display, or the like (as discussed further with respect to FIG. 12). The electronic device 100 typically also includes additional electronic components within the enclosure component 130. FIG. 1B schematically illustrates an electronic component 109 within the enclosure component 130. For example, the electronic component 109 may include one or more of a display, an input device, a sensor, memory, a processor, control circuitry, and a battery. Examples of electronic device components are described further with respect to FIG. 12.

Figure 2A:
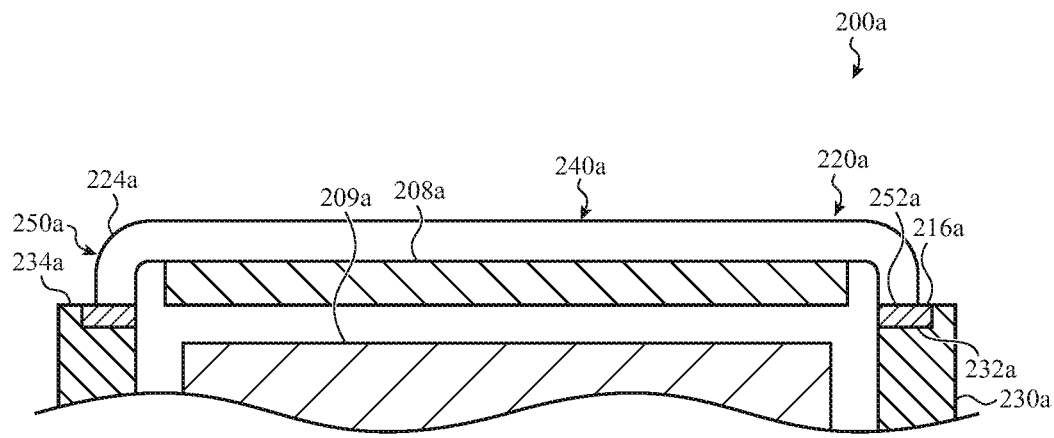
FIG. 2A depicts an example of a cross-sectional view of the electronic device of FIG. 1A.

FIG. 2A depicts a partial cross-sectional view of an electronic device 200a (along line A-A of FIG. 1A). The cover 220a of the electronic device 200a has a three-dimensional shape other than a flat sheet. As shown in FIG. 2A, the cover 220a includes a bend 224a (also referred to as a bend region or a curved region) between the central portion 240a and the end of the flange portion 250a (e.g., a distal end of the flange situated away from the central portion of the cover). In embodiments, the bend 224a is part of the flange portion 250a of the cover 220a. The flange portion 250a at least partially surrounds the central portion 240a of the cover 220a.

The flange portion 250a of the cover 220a is coupled to the enclosure component 230a. In particular, the end of the flange portion 250a defines a mounting surface 252a which is coupled to a corresponding mounting surface 232a of the enclosure component. The mounting surface 252a of the cover may also be referred to herein as a sealing surface, as a cover mounting surface, or as a cover sealing surface. The mounting surface 232a of the enclosure may also be referred to herein as an enclosure mounting surface or as an enclosure sealing surface.

The mounting surface 252a is coupled to the mounting surface 232a by an intermediate feature 216a. The intermediate feature 216a may function as a gasket. In embodiments, intermediate feature 216a is or includes an adhesive. In additional embodiments, the intermediate feature 216a also includes an electronic device component. For example, a force sensor may be positioned between the mounting surface 252a and the mounting surface 232a to measure the amount of force applied to the cover 220a during a touch event. The enclosure component 230a may define a lip 234a as well as the mounting surface 232a. The lip 234a may define an opening, recess, or other physical feature into which the flange portion 250a is inserted or at least partially constrained. In addition, the lip 234a may assist in retaining the flange portion 250a within the enclosure component 230a.

In some cases, such as the embodiment shown in FIG. 2A, an end of the flange portion 250a and the mounting surface 252a are not coplanar with the central portion 240a. Rather, the flange portion 250a extends at an angle with respect to the central portion 240a. By the way of example, the mounting surface 252a may define an angle with respect to the plane defined by the central portion 240a, such as an angle of 90 degrees or an angle from 80 degrees to 100 degrees. The shape of the cover 220a may be achieved by machining, molding, hot forming, or a combination thereof.

As shown in FIG. 2A, the central portion 240a of the cover 220a is coupled to the display 208a. The display 208a and the electrical component 209a of the electronic device 200a may be similar to the display 108 and the electrical component 109. For brevity, that description is not repeated here.

Figure 2B:
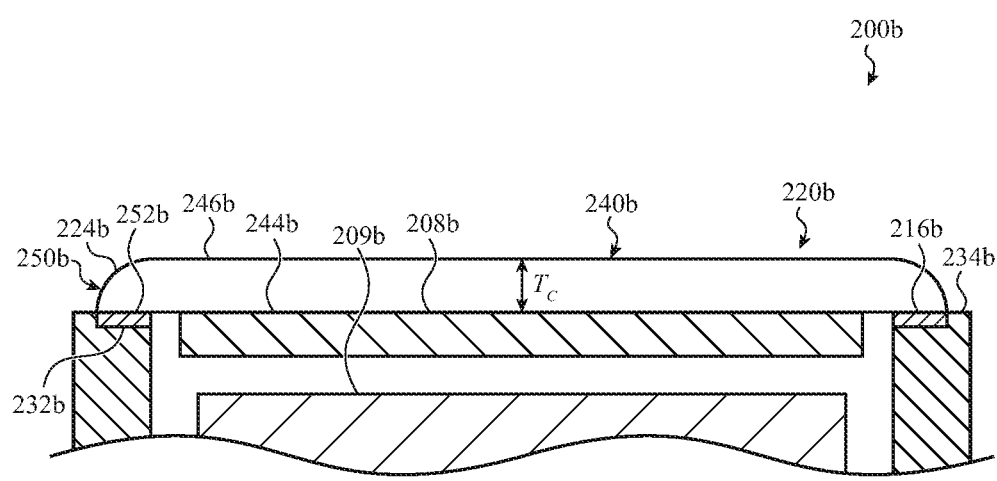
FIG. 2B depicts another example of a cross-sectional view of the electronic device of FIG. 1A.

FIG. 2B depicts another example of a cross-sectional view of an electronic device 200b. The cover 220b includes a central portion 240b at least partially surrounded by a peripheral portion 250b. As shown in FIG. 2B, the thickness Tc of the central portion 240b is greater than that of peripheral portion 250b. The cover defines an exterior surface 246b and an interior surface 244b opposite the interior surface. A region of the exterior surface 246b defined by the peripheral portion 250b defines a curve 224b which extends from a region of the exterior surface 246b defined by the central portion 240b to a region of the interior surface 244b defined by peripheral portion 250b. As an additional example, the curve 224b may extend to a side surface rather than extending all the way to the interior surface 244b.

The region of the interior surface defined by peripheral portion 250b defines a mounting surface 252b. The mounting surface 252b is coupled to a mounting surface 232b of the enclosure component 230b by an intermediate feature 216b. The intermediate feature 216b may include an adhesive.

As shown in FIG. 2B, the central portion 240b of the cover 220b is coupled to the display 208b. The display 208b and the electrical component 209b of the electronic device 200b may be similar to the display 108 and the electrical component 109. For brevity, that description is not repeated here.

Figure 3:
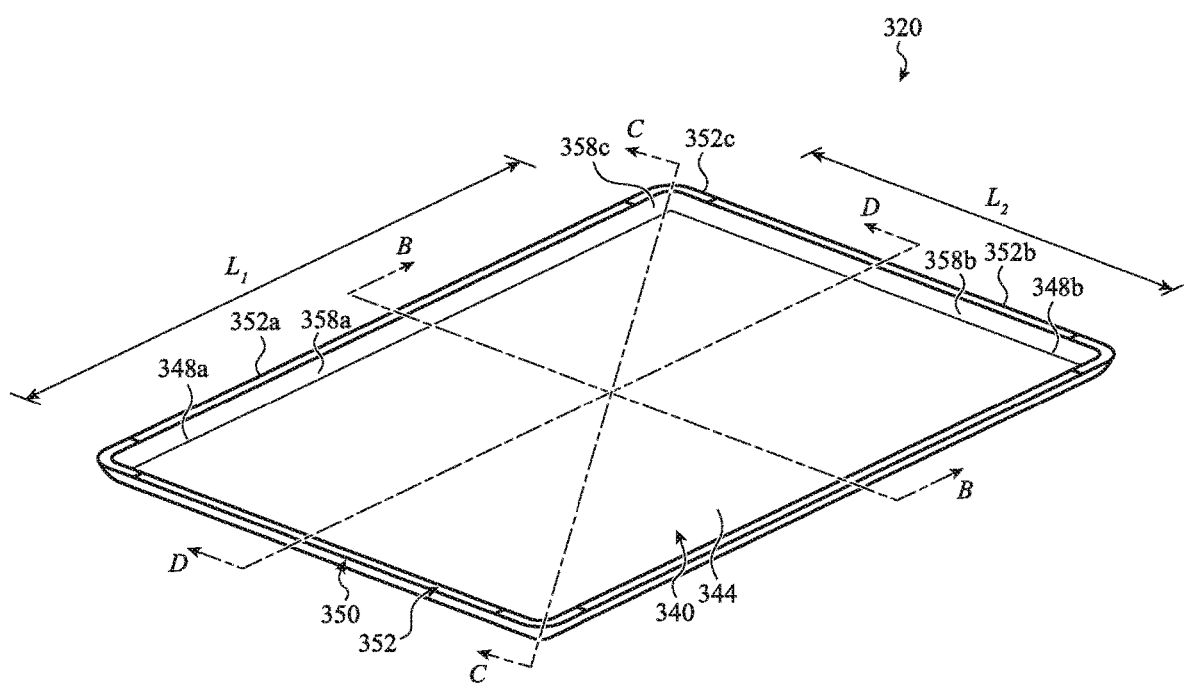
FIG. 3 depicts an example of a strengthened cover positioned to show the interior surface of the cover.

FIG. 3 depicts an example of a strengthened cover 320 which is positioned to show the mounting surface 352 and an interior surface 344 of the central portion 340. In embodiments, the mounting surface 352 is planar or flat within a specified tolerance. For example, the mounting surface 352 may be planar to within 25 microns, 20 microns, 15 microns, 10 microns, or 5 microns. In additional embodiments, the mounting surface 352 may be planar to within 5%, 2%, 1%, 0.5%, or 0.25% of the maximum height of the flange. The extent of planarity may also be referred to herein as the flatness of the mounting surface. In some cases, a region of the mounting surface, a region of the central portion of the cover, or a reference surface or plane may be used to determine the flatness of the mounting surface. The description of the planarity of strengthened covers is not limited to the cover 320, but is more generally applicable to the covers and ion-exchangeable cover components described herein.

In some embodiments, the flange portion of the cover defines multiple walls or flange segments. For example, the flange portion 350 of FIG. 3 defines a first wall 358a (or segment) extending along a first side 348a of the central portion 340, a second wall 358b (or segment) extending along a second side 348b of the central portion 340, and a third wall 358c (or segment) defining a corner extending between the first wall 358a and the second wall 358b. The third wall 358 may alternately be referred to as a corner wall or corner segment. The first wall 358a may have a first length $L_1$ and the second wall 358b may have a second length $L_2$. As shown in FIG. 3, the cover 320 defines two sets of parallel walls (or segments), with corner walls (or segments) joining walls (or segments) of the two sets. In additional embodiments, walls (or segments) may not be straight or may define a circle or an oval without distinct straight walls (or segments) and corner walls (or segments).

As shown in FIG. 3, the flange portion 350 defines a mounting surface 352 of the cover 320. In addition, the first wall 358a defines a first region 352a, the second wall 358b defines a second region 352b, and the third wall 358c defines a third region 352c of the mounting surface 352. Different regions of the mounting surface may be coplanar to within a specified tolerance. For example, different regions of the mounting surface may be coplanar to within 25 microns, 20 microns, 15 microns, 10 microns, or 5 microns. In additional embodiments, different regions of the mounting surface may be planar to within 5%, 2%, 1%, 0.5%, or 0.25% of a maximum height of the flange. The height of the flange may be measured from an interior surface of the central portion or an exterior surface of the central portion, as discussed further with respect to FIGS. 10A and 10B.

Figure 10A:
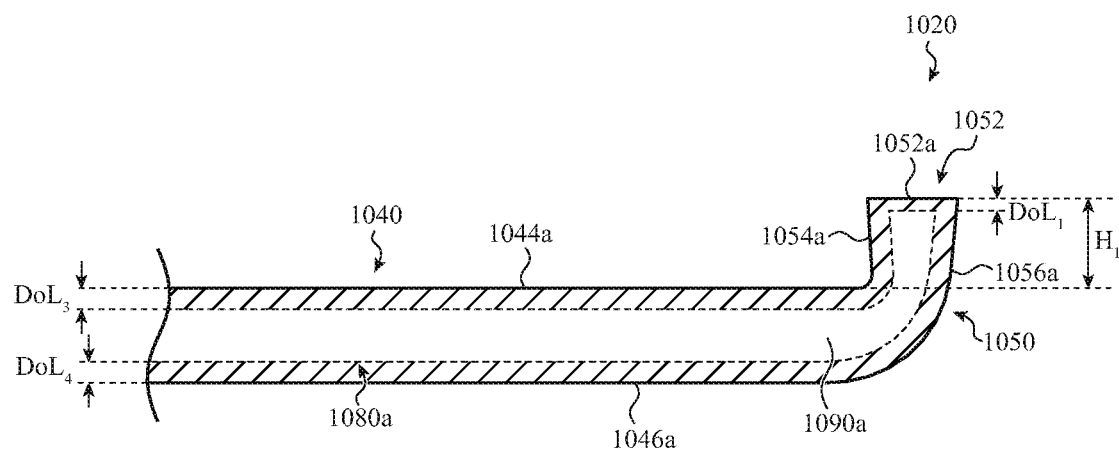
FIGS. 10A and 10B depict examples of compressive stress layers in the strengthened cover of FIG. 3.
Figure 10B:
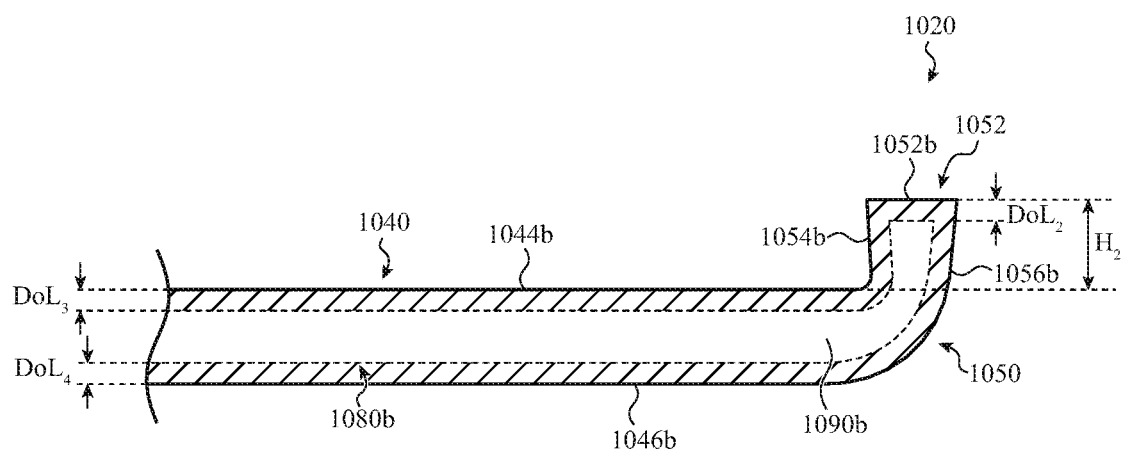

In some cases, the first wall 358a and the second wall 358b may be referred to as sidewalls of the flange 350. Local removal of material from the flange portion 350 between two ion-exchange operations may produce variation in the height of the walls (e.g., 358a, 358b, 358c) of the flange portion 350. FIGS. 10A and 10B schematically illustrate different wall heights at different regions of the mounting surface. For brevity, these aspects of the description of FIGS. 10A and 10B are not repeated here.

In some embodiments, strengthened covers such as cover 320 are produced by multiple ion-exchange operations. In some cases, at least some of the ion-exchange operations include exchanging ions in the cover for larger ions at a temperature below the strain point or glass transition temperature of the glass. Such ion-exchange operations tend to produce expansion of the cover within an ion-exchanged layer extending from a surface of the cover. In some embodiments, expansion of the cover due to ion-exchange may result in warping of the cover. Such ion-exchange operations may also produce compressive stress within the cover. Ion-exchange operations are described in more detail with respect to FIG. 5 and, for brevity, that description is not repeated here.

Figure 4A:
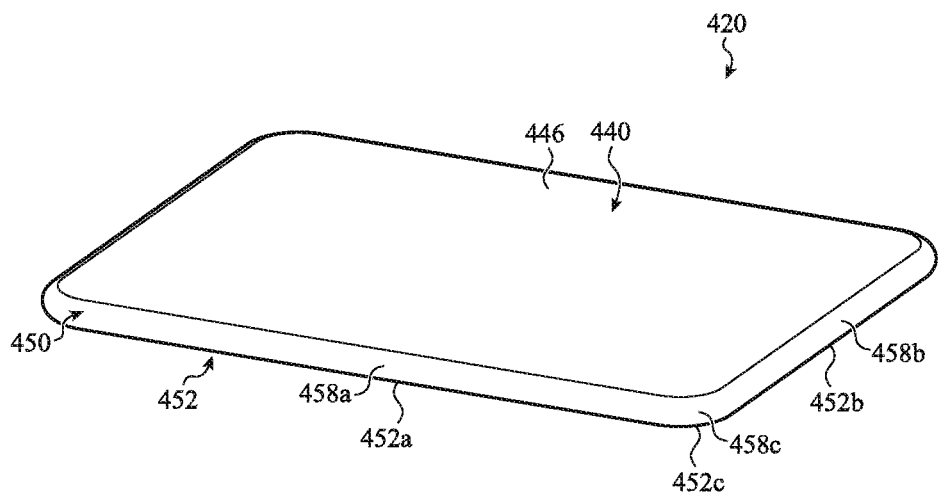
FIG. 4A depicts a top view of a cover before chemical strengthening.
Figure 4B:
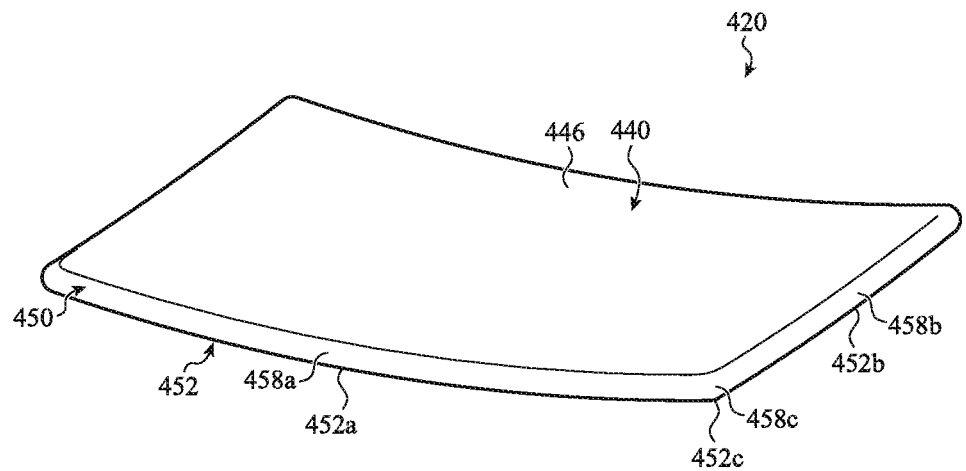
FIG. 4B depicts a top view of a cover after a first ion-exchange operation.

An ion-exchange operation of a cover (or a cover component) having a central portion and a flange portion at least partially surrounding the central portion can warp the mounting surface so that it lacks the desired extent of planarity, as schematically depicted by FIGS. 4A-4B. FIG. 4A depicts a cover 420 before a first ion-exchange operation. The cover 420 is positioned to show an exterior surface 446 of the central portion 440. FIG. 4A also shows walls 458a, 458b and 458c of the flange portion 450. In FIG. 4A, the first region 452a, the second region 452b and the third region 452c of the mounting surface 452 are coplanar to within the desired tolerance.

FIG. 4B schematically illustrates the cover 420 after the first ion-exchange operation, which results in warping of the cover 420. The extent of the warpage in FIG. 4B is exaggerated for purposes of illustration. In embodiments, the first region 452a of the mounting surface 452 is not coplanar with the third region 452c to within the desired tolerance after the first ion-exchange operation. In additional embodiments, the extent of planarity across the entire mounting surface 452 is not within the desired tolerance. For example, the flatness of the mounting surface 452 may be within 25 microns, 20 microns, 15 microns, 10 microns, or 5 microns. In additional embodiments, regions of the mounting surface 452 may be coplanar to within 5%, 2%, 1%, 0.5%, or 0.25% of the maximum height of the flange. The height of the flange is depicted in the detail view of FIG. 10B. The tolerances described with respect to FIG. 4B are not limited to the cover 420 but are more generally applicable to the covers described herein.

In the example of FIG. 4B, the first region 452a defined by the sidewall 458a is not coplanar with the third region 452c defined by the corner 458c. In some cases, the second region 452b may remain coplanar with the third region 452c to within the desired tolerance (as shown in FIG. 4B). In other cases, the second region 452b may not have the desired coplanarity with the third region 452c. In some embodiments, longer sidewalls (e.g., sidewall 458a) of the flange 450 display a greater amount of warp than shorter sidewalls (e.g., sidewall 458b).

Figure 5:
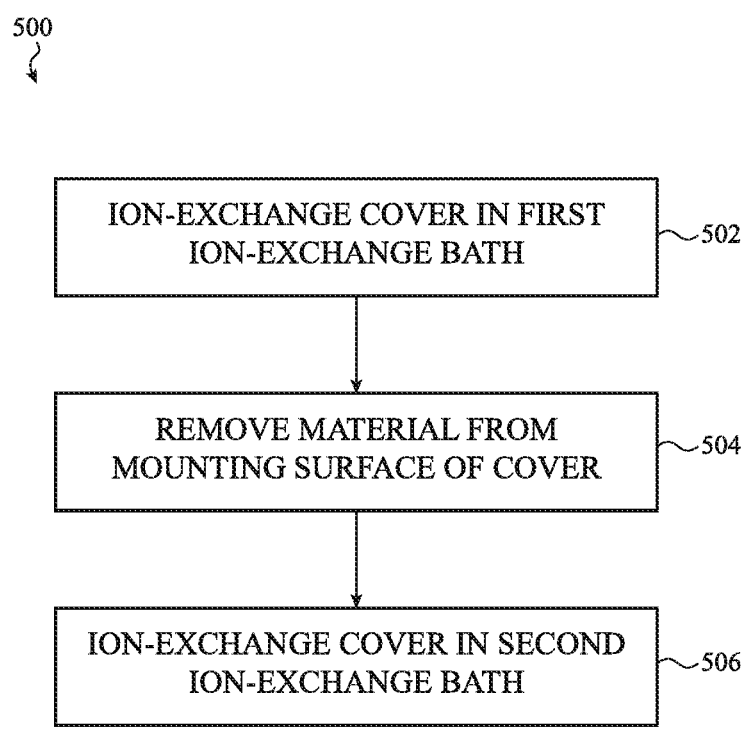
FIG. 5 depicts a flowchart of an example method for producing a chemically strengthened cover.

FIG. 5 depicts a flowchart of an example process 500 for chemically strengthening a cover while counteracting warpage of the cover due to ion-exchange. Process 500 includes at least two ion-exchange operations with an intermediate material removal operation. For example, the process 500 may be used to form the covers depicted in FIGS. 7A-11B. The description of FIG. 5 provided herein is also applicable to ion-exchangeable cover components, such as a glass or glass ceramic cover.

The process 500 includes at least two ion-exchange operations. In embodiments, the ion-exchange operations include exchanging ions in the cover for larger ions provided in a bath or paste external to the cover. Typically, an ion-exchange operation produces an ion-exchanged layer within the cover, modifies an ion-exchanged layer already present in the cover, or a combination thereof. When the ion-exchange operation occurs at a temperature below the strain point or a glass transition temperature of the glass, a compressive stress layer may be produced within the ion-exchanged layer. Typically, the cover is removed from the bath or the paste is removed from the cover after completion of the ion-exchange operation. The cover may be rinsed or washed after completion of the ion-exchange operation.

In embodiments, the cover may have a base composition (prior to ion-exchange) which includes alkali metal ions. For example, the cover may comprise an alkali aluminosilicate glass. In embodiments, the alkali aluminosilicate glass may include additional components, such as boron or an alkaline earth. In embodiments, the cover may have a base composition which includes lithium ions, with at least some of the lithium ions being exchanged for sodium ions and/or potassium ions during the ion-exchange operations. For example, the base composition may comprise lithium ions as the predominant alkali metal ions. As an additional example, the base composition may comprise from 0.1% to 10% lithium by weight of the base glass.

In some embodiments, alkali metal ions in the cover may be exchanged for alkali metal ions in the ion-exchange bath. Alkali metal ions from the ion-exchange bath are thus introduced into the cover. In other embodiments, the ion-exchange may involve other types of ion-exchangeable ions. The ion-exchange bath may comprise one or more molten ionic salts. In some cases, a single ionic salt is present in the ion-exchange bath. The ion-exchange bath temperature may be from the melting point of the salt to approximately 600° C. In embodiments, ion-exchange occurs along multiple surfaces of the glass. For example, ion-exchange may occur over one or more of the mounting surface, an exterior surface of the flange portion, an interior surface of the flange portion, an exterior surface of the central portion, and an interior surface of the central portion.

The temperature of the ion-exchange bath may be below a strain point or a glass transition point of a glass in the cover, so that exchanging alkali metal ions in the cover with larger alkali metal ions tends to cause an expansion of an ion-exchanged zone of the cover. However, expansion of the ion-exchanged layer of the cover may be constrained by a remainder of the cover which is not ion-exchanged. As a result, a compressive stress region, such as a biaxial residual compressive stress region, may be created in the ion-exchanged layer.

As depicted in FIG. 5, the process 500 may include a first ion-exchange operation 502 to form a first ion-exchanged layer. The cover may have a base composition prior to operation 502. In embodiments, operation 502 includes exchanging first ions, such as first alkali metal ions, in the cover with second ions, such as second alkali metal ions. The first ions have a first size and the second ions have a second size larger than the first size. The first ions may be exchanged for the second ions by immersing the cover in an ion-exchange bath comprising the second ions. The second ions are thus introduced into the cover and form the first ion-exchanged layer.

By the way of example, the exchange of the first alkali metal ions in the cover for the second alkali metal ions may include exchanging lithium ions in the cover for sodium ions. When sodium ions are to be introduced into the cover the ion-exchange bath may comprise sodium nitrate or another suitable sodium salt. The concentration of the sodium salt may be from 30 mol % to 100 mol %. In embodiments, the concentration of the sodium salt may be greater than 50 mol %. In embodiments, the ion-exchange bath may further comprise additional alkali metal ions in a lesser amount, such as potassium ions and/or lithium ions. The temperature of the ion-exchange bath may be from 350-450° C. and the time the cover spends in the ion-exchange bath may be from 4 hours to 10 hours.

Figure 7A:
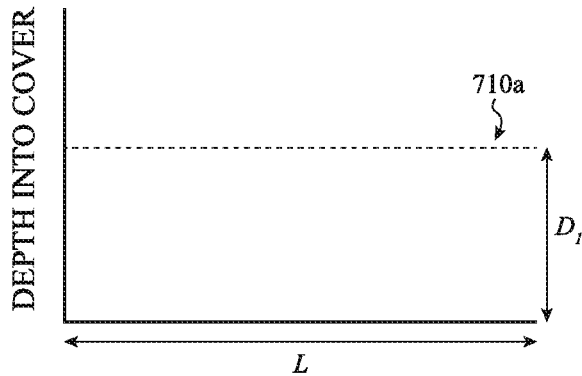
FIGS. 7A, 7B, and 7C schematically depict ion-exchanged layers formed at various stages of the example method of FIG. 5.

The operation 502 may form an ion-exchanged layer along surfaces of the cover. For example, the ion-exchanged layer may be formed along the interior surface, the exterior surface, and the mounting surface of the cover. The depth of the ion-exchanged layer may be from 75 microns to 200 microns. FIG. 7A schematically depicts a first ion-exchanged layer 710a formed along a sidewall region of the mounting surface. The depth of the first ion-exchanged layer is substantially uniform across the length of the sidewall. The exchange of the first alkali metal ions in the cover for the second alkali metal ions may produce a compressive stress layer within the ion-exchanged layer.

Following the operation 502, the process 500 may further include an operation 504 of removing material from the mounting surface of the cover. The operation 502 may tend to warp the cover as previously discussed with respect to FIG. 4B. In some embodiments, the operation 504 at least partially counteracts warpage of the cover resulting from operation 502.

In embodiments, material is removed locally from the mounting surface, rather than being removed uniformly from the entirety of the mounting surface. In further embodiments, a greater amount of material is removed from one region of the mounting surface (e.g., from a sidewall of the flange) as compared to another region along the mounting surface (e.g., from a corner of the flange). In further embodiments, no material is removed from the other region of the mounting surface (e.g., from the corner of the flange). Further, a maximum amount of material may be removed at and around a midpoint of the mounting surface defined by the sidewall. In embodiments, operation 504 results in the mounting surface being planar to within a specified tolerance, as previously discussed with respect to FIG. 4B. The material removed in the operation 504 is typically the ion-exchangeable material of the cover, such a glass material or a glass ceramic material.

In some cases, material is removed from opposing sidewalls of the cover during the operation 504. For example, for the cover shown in FIG. 4B, material may be removed from the mounting surface 452a of sidewall 458a and the mounting surface of the sidewall opposite sidewall 458a. In further embodiments, material is removed from two pairs of opposing sidewalls during operation 504.

Figure 7B:
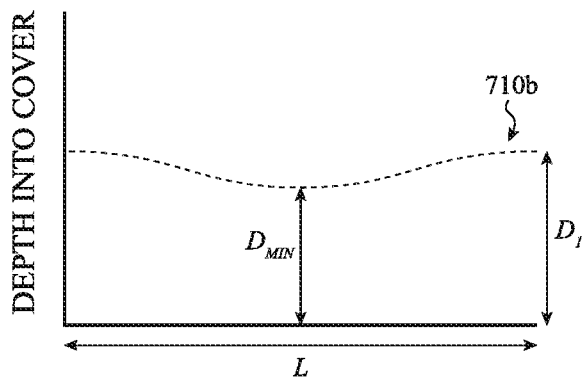

Typically, local removal of material from the mounting surface will locally reduce a depth of the first ion-exchanged layer formed in the operation 502. FIG. 7B schematically depicts a modified first ion-exchanged layer 710b along a length of the mounting surface after the operation 504. In the example of FIG. 7B, the depth of the modified first ion-exchanged layer 710b decreases from the corners towards the middle of the sidewall.

Figure 9A:
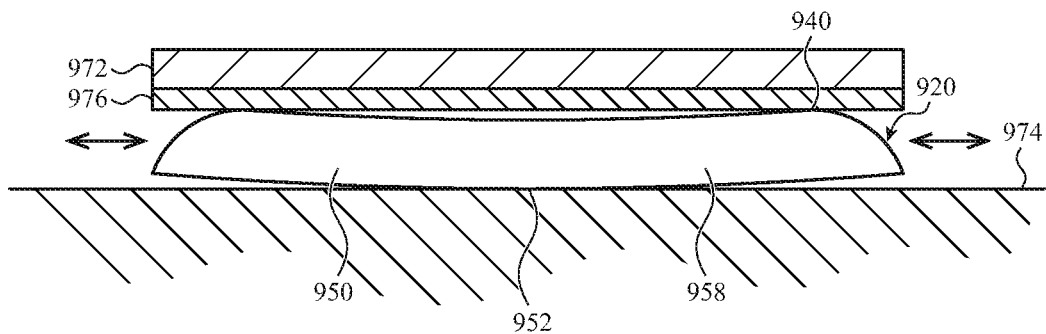
FIGS. 9A and 9B schematically depict stages in an example operation of removing material from the mounting surface of the cover.

In embodiments, a polishing operation is used to remove material from the mounting surface of the cover. By the way of example, the cover may be positioned so that at least part of a first region of the mounting surface (e.g., defined by the sidewall of the flange) is in contact with a polishing surface while a second region of the mounting surface (e.g., defined by a corner of the flange) is not in contact with the polishing surface (as shown in FIG. 9A). The polishing surface may comprise particles of an abrasive material, such as diamond or a ceramic (e.g., alumina, silicon carbide, and/or ceria). The polishing surface may be sufficiently hard or rigid to allow local removal of material from the mounting surface when the cover is pressed against and moved along the polishing surface. In embodiments, the particles of the abrasive material may be provided in a slurry comprising a carrier liquid and the abrasive material.

In some embodiments, the maximum depth of material removed from the mounting surface is small relative to a height of the flange. For example, material may be removed to a maximum depth of 0.05%, 1%, 2%, or 5% of a height of the flange. As examples, material may be removed from the mounting surface to a maximum depth of 10 microns to 50 microns or of 15 microns to 40 microns. In further embodiments, the maximum depth of material removed from a location on the mounting surface is less than a depth of the ion-exchanged layer formed at that location in the operation 502.

Following the operation 504, the process 500 may further include a second ion-exchange operation 506. In some cases, the second ion-exchange operation 506 may be regarding as forming a second ion-exchanged layer within the first ion-exchanged layer. Therefore, the extent of ion-exchange produced by the operation 506 may be shallower than that produced by the operation 504.

In some embodiments, the depth of the second ion-exchange layer produced by the second ion-exchange operation 506 is sufficiently shallow that little, if any, additional warpage is introduced into the cover. In embodiments, the flatness of the mounting surface after the second ion-exchange operation 506 is within 25 microns, 20 microns, 15 microns, 10 microns, or 5 microns. In additional embodiments, the mounting surface may be planar to within 5%, 2%, 1%, 0.5%, or 0.25% of the maximum height of the flange.

In some embodiments, the operation 506 includes exchanging second ions, such as the second alkali metal ions, in the cover with third ions, such as third alkali metal ions. The third ions have a third size larger than the second size and the first size. The second ions may be exchanged for the third ions by immersing the cover in an ion-exchange bath comprising the third ions. The third ions are thus introduced into the cover. In embodiments, the operation 506 further comprises other exchanges of ion. For example, first alkali metal ions remaining in the first ion-exchange layer may be exchanged for the third alkali metal ions. Additional exchange of the first alkali metal ions for the second alkali metal ions may also occur, thereby increasing the overall depth of the ion-exchanged layer.

By the way of example, exchanging second alkali metal ions in the cover with third alkali metal ions may include exchanging sodium ions in the cover for potassium ions. When potassium ions are to be introduced into the cover, the ion-exchange bath may comprise potassium nitrate or another suitable potassium salt. The concentration of the potassium salt may be from 30 mol % to 100 mol %. In embodiments, the concentration of potassium salt is greater than 50 mol %. In further embodiments, the ion-exchange bath may further comprise additional alkali metal ions in a lesser amount, such as sodium ions. The temperature of the ion-exchange bath may be from 300-500° C. The time the cover spends in the ion-exchange bath may be from 15 minutes to 4 hours.

In some embodiments, the composition of a second ion-exchange bath used in the operation 504 is different from the composition of a first ion-exchange bath used in the operation 502. For example, the second ion-exchange bath may have a greater concentration of the third alkali metal ions and a lesser concentration of the second alkali metal ions than the first ion-exchange bath. In additional embodiments, the composition of the second ion-exchange bath used in the operation 502 may be about the same as the composition of the first ion-exchange bath used in the operation 504 and may include a mixture of ionic salts.

Figure 7C:
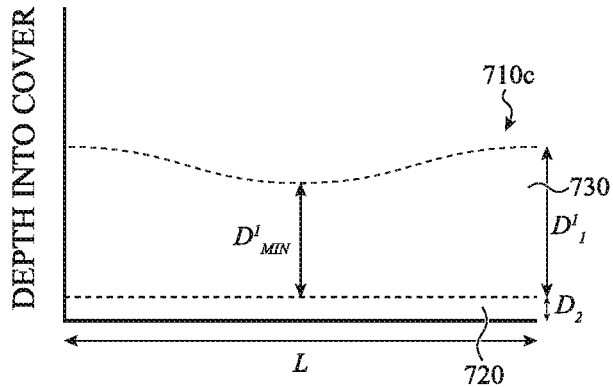

In some cases, the ion-exchange operation 506 may be viewed as forming a second ion-exchanged layer within the first ion-exchanged layer. The overall or combined ion-exchanged layer after the ion-exchange operation 506 thus comprises the second ion-exchanged layer and a portion which extends beyond the second ion-exchanged layer and is derived from the first ion-exchanged layer. FIG. 7C schematically depicts an example of a second ion-exchanged layer formed within a first ion-exchanged layer. More particularly, FIG. 7C shows an overall ion-exchanged layer 710c that includes a second ion-exchanged layer 720 (which has a substantially uniform depth along the length of the mounting surface) and a portion 730 that is derived from or remains of the first ion-exchanged layer. As shown in FIG. 7B, the portion 730 may have a non-uniform depth along the length of the mounting surface after the operation 506.

In some embodiments, the depth of the second ion-exchanged layer, such as second ion-exchanged layer 720, may be determined from the depth of the third ions (e.g., potassium ions) introduced by the second ion-exchange operation 506. The overall depth of the ion-exchanged layer, such as overall ion-exchanged layer 710c, may be determined from the depth of the second ions (e.g., sodium ions) introduced by the first ion-exchange. FIG. 7C schematically depicts the overall depth of the ion-exchanged layer 710c (varying from $D'_{MIN}$ to $D'_1$) and the depth of the third ions ($D_2$) after the operation 506. The depth $D'_1$ may be greater than the depth $D_1$ due to deeper diffusion of the second ions introduced by the first ion-exchange operation 502 into the cover during the second ion-exchange operation 506.

The ion-exchange operation 506 may also be viewed as forming an ion-exchanged layer having two zones of differing composition: a surface zone and an internal zone. The surface zone corresponds to the second ion-exchanged layer described above and the internal zone corresponds to the portion of the ion-exchanged layer extending beyond the surface zone (e.g., further into the glass than the surface zone). FIG. 7C schematically depicts the ion-exchanged layer as a whole 710c, the internal zone 730, and the surface zone 720 along the length of a sidewall region of the mounting surface.

In some embodiments, the surface zone of the ion-exchanged layer is enriched in the third alkali metal ions (e.g., potassium ions) as compared to the internal zone. The surface zone extends from the surface of the cover to a depth determined from the depth of the third ions (e.g., potassium ions) introduced by the second ion-exchange. In some cases, the depth of the surface zone is uniform or nearly so over the mounting surface. Further, the depth of the surface zone may be uniform or nearly so along multiple surfaces of the cover. In other cases, the depth of the surface zone may vary along the mounting zone, such as when a mixed salt bath is used during the operation 502.

In some embodiments, the internal zone of the ion-exchanged layer is enriched in the second alkali metal ions (e.g., sodium ions) as compared to the base composition of the glass. The internal zone extends from the depth of the surface zone to the overall depth of the ion-exchanged layer. Typically, the overall depth of the ion-exchanged layer varies along the mounting surface as a result of the operation 504, as schematically depicted in FIG. 7C.

The ion-exchanged layer resulting from the operation 506 produces a compressive stress layer along surfaces of the cover. For example, the compressive stress layer may be produced along the mounting surface as well as along surfaces of the central portion and the flange portion. In some cases, non-uniformity of the ion-exchanged layer along the surfaces of the cover produces non-uniformity of the compressive stress layer along the surfaces of the cover. The compressive stress layer along various surfaces of the cover is described further with respect to FIGS. 10A and 10B. A tensile stress layer (alternately, tensile stress region) is produced inward from the compressive stress layer.

Figure 6:
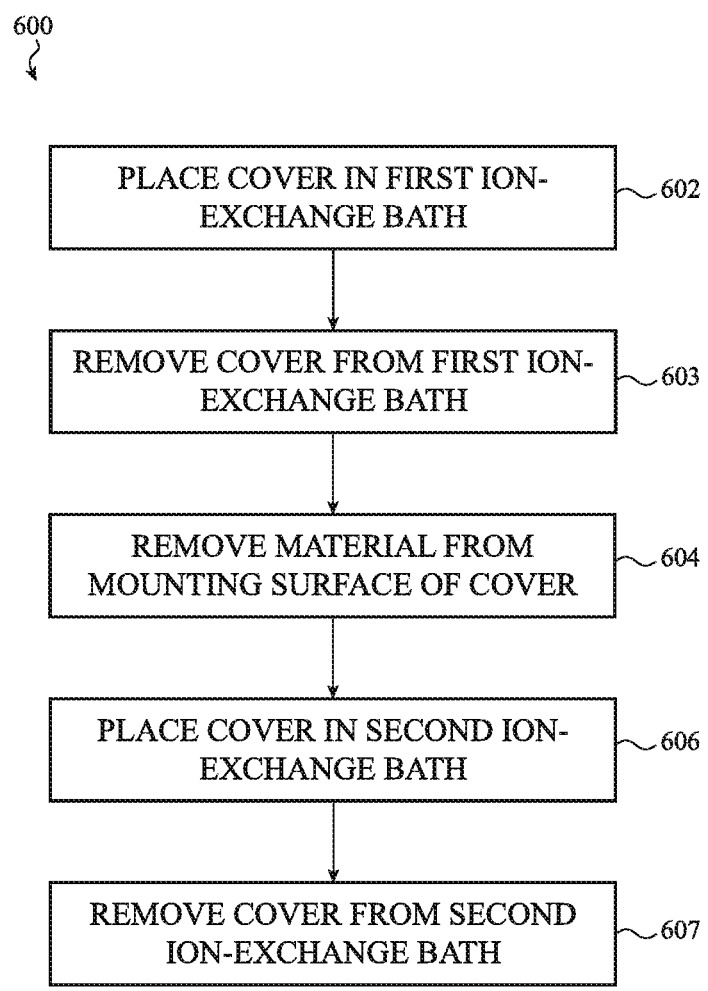
FIG. 6 depicts a flowchart of an additional example method for producing a chemically strengthened cover.

FIG. 6 depicts a flowchart of another example process 600 for strengthening a cover while counteracting warpage of the cover due to ion-exchange. For example, process 600 may be used to form the covers depicted in FIGS. 7A-11B. The description of FIG. 6 provided herein is also applicable to ion-exchangeable cover components, such as a glass or glass ceramic cover.

Process 600 may include an ion-exchange operation 602. The ion-exchange operation 602 may comprise placing a cover in a first ion-exchange bath. The ion-exchange operation 602 may form a first ion-exchanged layer in the cover. In embodiments, the process conditions for ion-exchange operation 602 are similar to those described for ion-exchange operation 502. Process 600 further includes the operation 603 of removing the cover from the first ion-exchange bath following the ion-exchange operation 602. In embodiments, the cover may be rinsed after removing it from the first ion-exchange bath.

Following the operation 603, the process 600 may further include the operation 604 of removing material from the mounting surface of the cover. In embodiments, the process conditions for the operation 604 are similar to those described for the operation 504.

The process 600 further incudes an ion-exchange operation 606. The ion-exchange operation 606 may comprise placing the cover in a second ion-exchange bath. The ion-exchange operation 602 may form a second ion-exchanged layer within the first ion-exchanged layer. In some embodiments, the process conditions for the ion-exchange operation 606 are similar to those described for the ion-exchange operation 506. The process 600 further includes the operation 607 of removing the cover from the second ion-exchange bath following the ion-exchange operation 606. In some cases, the cover may be rinsed after removing it from the second ion-exchange bath.

For simplicity, the operations of the process 500 and the process 600 are described with respect to a cover. The description of the processes 500 and 600 also applies more generally to chemical strengthening of an ion-exchangeable component of a multi-component cover, such as a glass or glass ceramic cover component. The chemically strengthened layer may then be combined with one or more additional layers using appropriate deposition, coating, and/or bonding techniques, thereby forming a multilayer cover. For example, an oleophobic coating may be applied using liquid or vapor deposition techniques.

FIGS. 7A-7C, referred to initially in conjunction with FIG. 5, schematically depict examples of the depth of the ion-exchanged layer(s) in a ion-exchangeable cover or cover component as a function of distance along a sidewall (e.g., sidewall 458a in FIG. 4B). FIGS. 7A schematically illustrate the ion-exchanged layer different stages in the process 500 or 600. In the example shown in FIG. 7A, the depth $D_1$ of the ion-exchanged layer 710a is approximately constant along the length of the sidewall after the first ion-exchange operation (e.g., the operation 502). The ion-exchanged layer 710a may also be referred to as a first ion-exchanged layer.

In some cases, the depth D1 of the ion-exchanged layer 710a may indicate the depth of the second ions introduced during a first ion-exchange operation. Examples of compressive stress profiles resulting from the ion-exchanged layers are shown in FIGS. 10A-11B and for brevity that description is not repeated here.

As depicted in FIG. 7B, an operation of removing material from the mounting surface modifies the ion-exchanged layer 710a, producing ion-exchanged layer 710b. After an operation of removing material from the mounting surface of the sidewall (e.g., the operation 504), the depth of the ion-exchanged layer 710b varies from $D_{MIN}$ to $D_1$ along the length of the sidewall. In the example shown in FIG. 7B, the depth of the ion-exchanged layer remains equal to $D_1$ near the corners of the flange, but reaches a minimum ($D_{MIN}$) at about a midpoint of the sidewall mounting surface. In some cases, the ion-exchanged layer 710b may also be referred to as a modified first ion-exchanged layer.

A second ion-exchange operation (e.g., the operation 506) modifies the ion-exchanged layer 710b of FIG. 7B. As depicted in FIG. 7C, a second ion-exchanged layer 720 has been formed within the first ion-exchanged layer 710b of FIG. 7B. The depth $D_2$ of the second ion-exchanged layer 720 is approximately uniform along the length of the sidewall. The ion-exchanged layer 710c extends beyond the second ion-exchanged layer. The depth of ion-exchanged layer 710c varies along the length of the sidewall in a similar fashion as shown in FIG. 7B. For example, the depth of the ion-exchanged layer is $D'_1$ near the corners of the flange but decreases to a minimum $D'_{MIN}$ at about a midpoint of the sidewall mounting surface. $D'_1$ may be greater than $D_1$ and $D'_{MIN}$ may be greater than $D_{MIN}$ after operation 506 due to deeper diffusion of the second ions into the cover during operation 506. In embodiments, $D_1'$ is about the same as $D_1$ and $D'_{MIN}$ is about the same as $D_{MIN}$.

As previously described, the second ion-exchanged zone 720 may define a surface zone of ion-exchanged layer 710c while a remainder 730 of ion-exchanged layer 710c may define an internal zone of the ion-exchanged layer. Typically the surface zone and the internal zone have different ion concentrations as schematically illustrated in FIGS. 8A and 8B.

Figure 8A:
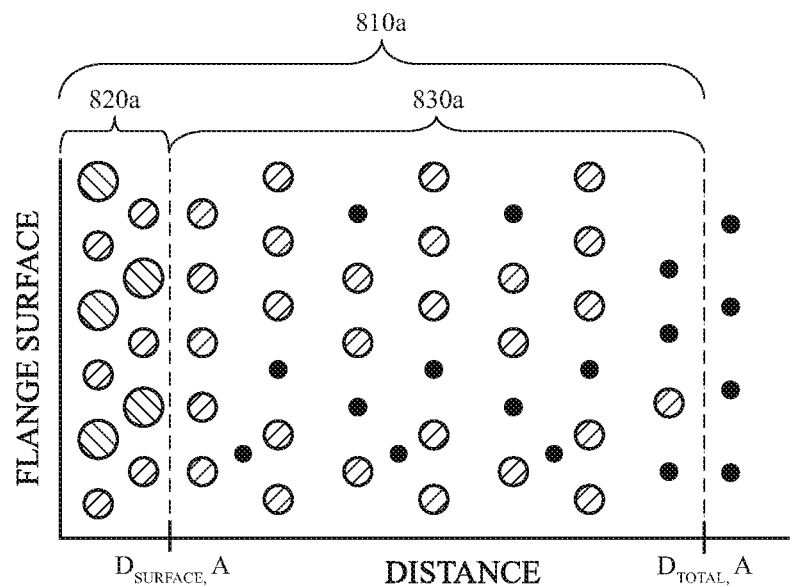
FIGS. 8A and 8B schematically depict ion distributions in the strengthened cover of FIG. 3.
Figure 8B:
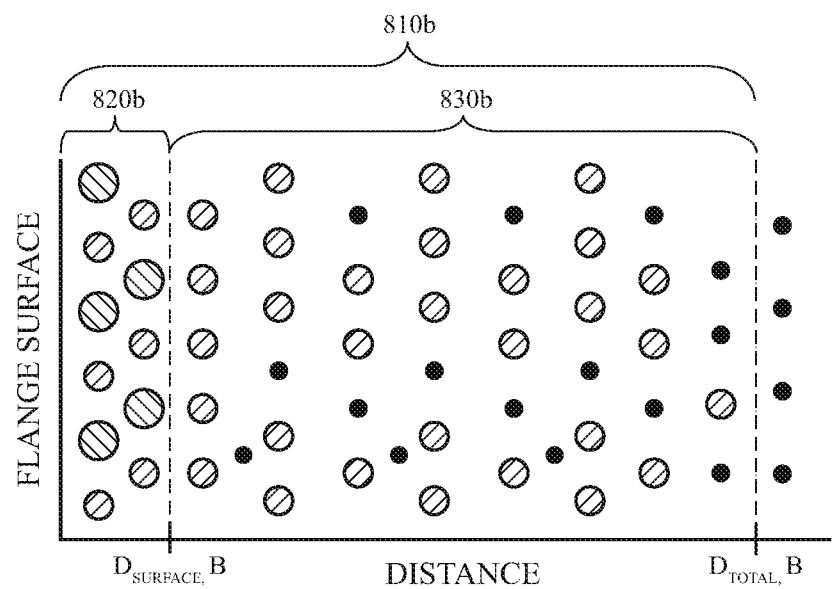

FIGS. 8A and 8B schematically depict examples of ion distributions in ion-exchanged layers extending from different regions of the mounting surface of an ion-exchangeable cover or cover component. For example, FIGS. 8A and 8B may show a cover after the operation 506 of the process 500. FIG. 8A depicts an ion-exchanged layer 810a extending from a region of the mounting surface from which a greater amount of material was removed (e.g., a middle portion of the length of the mounting surface). The overall depth of the ion-exchanged layer 810a is indicated by $D_{TOTAL,A}$. The surface zone 820a extends from the surface to a depth $D_{SURFACE,A}$. As shown in FIG. 8A, the surface zone 820a is enriched in the third ions as compared to an internal zone 830b. The internal zone 830a extends from the surface zone 820a to the overall depth $D_{TOTAL,A}$ of the ion-exchanged layer 810a. As shown in FIG. 8A, the internal zone 830a is enriched in the second ions as compared to the base composition of the glass. The surface zone 820a may be a first surface zone and the internal zone 830a may be a first internal zone.

FIG. 8B depicts an ion-exchanged layer 810b extending from a region of the mounting surface from which a lesser amount of material was removed. The overall depth of the ion-exchanged layer 810b is indicated by $D_{TOTAL,B}$. As shown in FIG. 8B, the surface zone 820b is enriched in the third ions as compared to an internal zone 830b. The surface zone 820b extends from the surface to a depth $D_{SURFACE,B}$. As shown in FIG. 8B, the internal zone 830b is enriched in the second ions as compared to the base composition of the glass. The internal zone 830b extends from the surface zone 820b to the overall depth $D_{TOTAL,B}$ of the ion-exchanged layer 810b. The difference between the total depth of the ion exchanged layer and the depth of the surface zone may be referred to as the thickness of the internal zone of the ion-exchanged layer. In embodiments, $D_{SURFACE,A}$ is approximately equal to $D_{SURFACE,B}$, but $D_{TOTAL,A}$ is less than $D_{TOTAL,B}$. The surface zone 820b may be a second surface zone and the internal zone 830b may be a second internal zone.

In FIGS. 8A and 8B, the first ions are schematically shown by the smaller dark circles, the second ions are shown by larger circles with a first hatching, and the third ions are shown by the largest circles with a second hatching different than the first. The ions in FIGS. 8A and 8B are not shown to scale, but are enlarged for the purposes of illustration. The differences in concentration of the first, second and third ions are also schematically shown. For simplicity, other atoms or ions present in the cover, such as silicon and oxygen, are not shown. In some cases, measurements of ion concentration are conducted over a sufficiently large area of the mounting surface to obtain average ion concentration values. As examples, the ion concentrations in the cover may be measured using such techniques as energy dispersive x-ray spectroscopy (EDXS) and secondary ion mass spectrometry (SIMS). For simplicity, the ion-exchanged layers and zone of FIGS. 8A and 8B are described with respect to a cover.

Figure 9B:
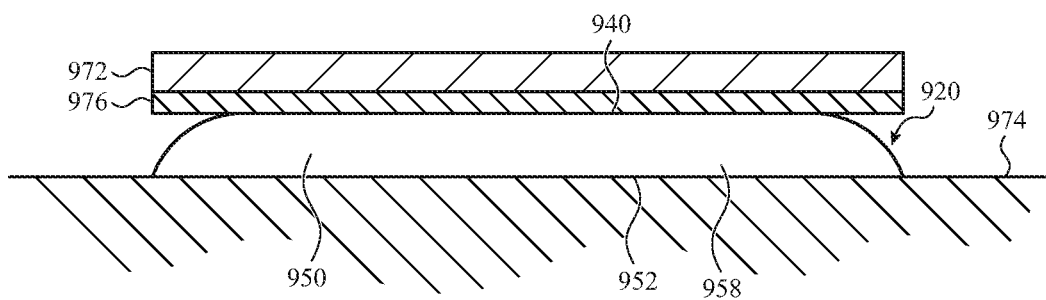

FIGS. 9A-9B schematically depict stages in an example operation of removing material from the mounting surface of the cover 920 (e.g., the operation 504). The cover 920 is shown in side view that presents a sidewall 958 to the viewer. FIG. 9A depicts an initial stage in a polishing operation. A member 972 is used to press the cover 920 against a polishing surface 974. A compliant member 976 is placed between the member 972 and the cover 920 and is configured to apply pressure to at least a portion of the flange 950 as well as the central portion 940. The compliant member 976 may comprise a foam, a brush, or the like. Due to the warp of the cover 920 in FIG. 9A, only a portion of the mounting surface 952 initially contacts the polishing surface 974. The double headed arrows schematically indicate motion of the cover with respect to the polishing surface. The motion may be linear (back and forth), rotational, or combinations thereof.

FIG. 9B depicts a later stage of the polishing operation. Due to local removal of material from the sidewall 958 of the flange 950, the variation in the height of the mounting surface 952 along the sidewall is reduced as compared to the cover 920 of FIG. 9A. In addition, the mounting surface 952 in FIG. 9B has improved planarity as compared to the mounting surface 952 of FIG. 9A.

FIGS. 10A and 10B schematically depict compressive stress layers along different surfaces of a strengthened cover 1020. The description of FIGS. 10A and 10B provided herein is also applicable to ion-exchangeable cover components, such as a glass or glass ceramic cover.

FIG. 10A is a partial cross-section including a first region 1052a of the mounting surface 1053, such as a first sidewall mounting surface. For example, the cross-section of FIG. 10A may be along line B-B of FIG. 3. FIG. 10B is a partial cross-section including a second region 1052b of the mounting surface 1052, such as a corner mounting surface. For example, the cross-section of FIG. 10A may be along line C-C of FIG. 3.

The height $H_1$ of the first region 1052*a* may be less than the height $H_2$ of the second region 1052*b*, as measured from the interior surfaces 1044*a*, 1044*b* of the cover 1020. Height $H_1$ provides a measure of the height of the wall defined by the flange at the first region (e.g., a sidewall) while height $H_2$ provides a measure of the height of the wall at the second region (e.g., a corner wall or segment). In further embodiments, a height of a region of the mounting surface and its corresponding wall may be measured from the exterior surface of the cover.

As depicted in FIG. 10A, the compressive stress layer 1080*a* has a depth of layer $DoL_1$ along the first region 1052*a* of the mounting surface. As depicted in FIG. 10B, the compressive stress layer 1080*b* has a depth of layer $DoL_2$ along the second region 1052*b* of the mounting surface, with $DoL_2$ being greater than $DoL_1$. For example, the compressive stress layer along a sidewall mounting surface may have a depth of layer $DoL_1$ less than $DoL_2$ along a corner mounting surface. As examples, the difference between $DoL_2$ and $DoL_1$ may be from 10 microns to 50 microns or from 15 microns to 40 microns. The cover also includes a region or layer of tensile stress 1090*a* inward from the compressive stress layer 1080*a*.

As depicted in FIG. 10A, compressive stress layer 1080*a* also extends along an interior surface 1044*a* of a central portion 1040 of the cover 1020 and an interior surface 1054*a* of the flange portion 1050 of the cover 1020. The interior surfaces 1044*a* and 1054*a* cooperate to form an interior surface of the cover. In the embodiment of FIG. 10A, the depth of layer $DoL_1$ along the first region 1052*a* of the mounting surface less than the depth of layer $DoL_3$ along the interior surface of the cover.

Further compressive stress layer 1080*a* extends along an exterior surface 1046*a* of the central portion 1040 of the cover and an exterior surface 1056*a* of the flange portion 1050 of the cover 1020. The exterior surfaces 1046*a* and 1056*a* cooperate to form an exterior surface of the cover. In the embodiment of FIG. 10A, the depth of layer $DoL_1$ along the first region 1052*a* of the mounting surface is less than the depth of layer $DoL_4$ along the exterior surface of the cover 1020.

In contrast, the depth of the compressive stress layer 1080*b* in FIG. 10B is approximately uniform around the cover. Therefore, the depth $DoL_3$ of the compressive stress layer 1080*b* along the interior surface of the cover 1020 and the depth $DoL_4$ along the exterior surface of the cover 1020 is approximately equal to $DoL_2$. The cover also includes a region or layer of tensile stress 1090*b* inward from the compressive stress layer 1080*b*.

In the embodiments shown in FIGS. 10A and 10B, the interior surface and the exterior surfaces of the cover are strengthened symmetrically, so that $DoL_3$ is approximately equal to $DoL_4$. However, in additional embodiments, the depth of layer (DoL) along the interior surface and the exterior surface of the cover 1020 may differ. For example, $DoL_3$ may be slightly greater than $DoL_4$ if any material is removed from the exterior surface of the cover during polishing.

When the cover has sidewalls of approximately equal length, a cross-section through a second sidewall region of the mounting surface (around the corner from the first sidewall region) may look similar to that of FIG. 10A, with the compressive stress layer along the mounting surface of the second sidewall region having a depth approximately equal to $DoL_1$. When the cover has a first pair of sidewalls each having a first length and a second pair of sidewalls each having a second length less than the first length, the extent of warping of the second pair of sidewalls may be less than for the first pair of sidewalls. In this case, a cross-section through the shorter sidewall (such as along line D-D in FIG. 3) may look similar to that of FIG. 10B or intermediate between that of FIGS. 10A and 10B. For example, the compressive stress layer along the mounting surface of the second sidewall region may have a depth approximately equal to $DoL_2$ or intermediate between $DoL_1$ and $DoL_2$.

Figure 11A:
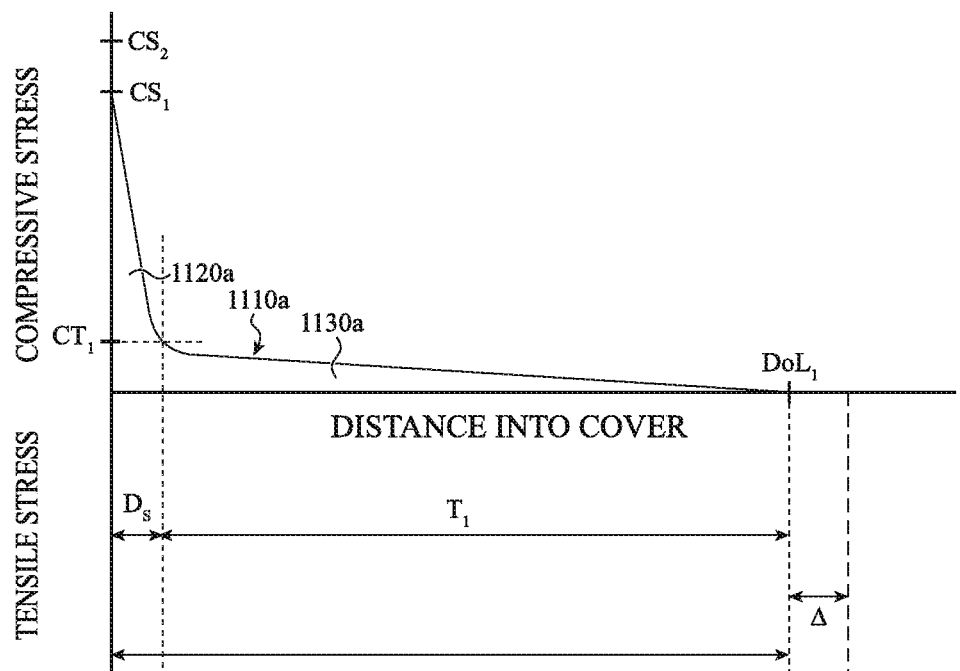
FIGS. 11A and 11B depict examples of stress as a function of distance for the strengthened cover of FIG. 3.
Figure 11B:
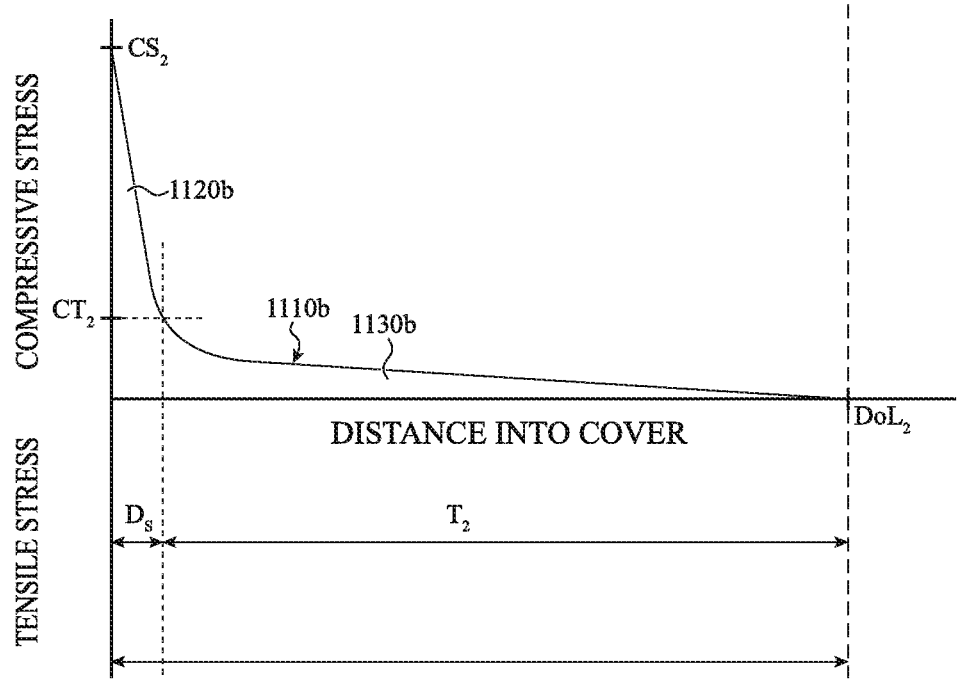

FIGS. 11A and 11B schematically depict compressive stress as a function of distance into a cover from a first region and a second region, respectively, on the mounting surface. The description of FIGS. 11A and 11B provided herein is also applicable to an ion-exchangeable cover component such as a glass or glass ceramic cover. For example, FIGS. 11A and 11B may depict the cover after the final ion-exchange operation in a process.

A greater amount of material was removed from the first region, depicted in FIG. 11A, than from the second region, depicted in FIG. 11B. As an example, a maximum amount of material may have been removed from the first region while less, if any, material may have been removed from the second region. In some cases, the first region of the mounting surface is a sidewall mounting surface while the second region is a corner mounting surface. The curves of FIGS. 11A and 11B may also be referred to as compressive stress profiles. As previously discussed, tensile stress is typically present deeper in the cover but for simplicity the tensile stress profile is not shown in FIGS. 11A and 11B.

In embodiments, the compressive stress layer extending along the mounting surface has a sufficient depth of layer and a sufficient surface compressive stress to strengthen the cover. For example, the surface compressive stress may be sufficiently high to provide a desired bend strength to the cover and to the flange portion. In some cases, a four point bend strength test may be used to measure a bend strength (also referred to as flexural strength) of the flange portion by measuring a modulus of elasticity in bending.

As depicted in FIG. 11A, the compressive stress layer 1110*a* extends from the first region of the mounting surface to a depth $DoL_1$ into the cover (or cover component). In embodiments, $DoL_1$ is from 75 microns to 200 microns or from 100 microns to 150 microns. The compressive stress layer also has a first surface compressive stress $CS_1$ at the first region of the mounting surface. In embodiments, $CS_1$ is from 400 MPa to 800 MPa.

As depicted in FIG. 11B, the compressive stress layer 1110*b* extends from the second region of the mounting surface to a depth $DoL_2$ into the cover (or cover component). As depicted in FIGS. 11A-11B, $DoL_2$ is greater than $DoL_1$. The difference is indicated by the distance A in FIG. 11A. In embodiments, $DoL_2$ is from 100 microns to 250 microns or from 150 microns to 225 microns. The compressive stress layer also has a second surface compressive stress $CS_2$ at the second region of the mounting surface. As depicted in FIGS. 11A-11B, $CS_2$ is greater than $CS_1$. In embodiments, $CS_2$ is greater than $CS_1$ by up to 5%, 10%, 15%, or 20%. In embodiments, $CS_2$ is from 500 MPa to 850 MPa.

In some cases, the compressive stress layer comprises a surface zone and an internal zone. The surface zone (1120*a* in FIG. 11A and 1120*b* in FIG. 11B) extends from the mounting surface to a depth $D_S$ into the part and has a steeper downward (negative) slope than the internal zone.

The surface zones 1120*a* and 1120*b* may be located a portion of the ion-exchanged layer which is enriched in the third ions.

In some embodiments, $D_S$ is the same or approximately the same for the compressive stress layer at the first region of the mounting surface (where material was removed) and for the compressive stress layer at the second region of the mounting surface (where less or no material was removed). For example, DS may be from 5 microns to 50 microns. The internal zone (1130*a* in FIG. 11A and 1130*b* in FIG. 11B) extends from $D_S$ to the depth of the compressive stress layer (e.g., $DoL_1$ or $DoL_2$). The difference between the depth of the compressive stress layer and the depth of the surface zone of the compressive stress layer may be referred to as the thickness of the internal zone of the compressive stress layer ($T_1$ in FIG. 11A and $T_2$ in FIG. 11B).

The compressive stress profiles for each of the two regions may decrease substantially continuously (without a step) from the surface to the depth of layer. In some cases, "tail" portions (near the depth of layer) of the compressive stress profiles for the two regions of the mounting surface are similar. For example, a tail portion of FIG. 11B may be similar to that of FIG. 11A, but shifted to deeper into the cover. In addition, a slope of the tail portion of FIG. 11A may be about the same as the slope of the tail portion of FIG. 11B. In other cases, the slope (or other profile shape, where the profile is not linear) of the internal zone 1130*a* is greater than the slope (or other profile shape) of the internal zone 1130*b* at a given distance from the surface of the cover.

In some embodiments, the magnitude of the compressive stress at the transition between the surface zone and the internal zone may be different for the compressive stress layers extending from the first and second regions of the mounting surface. In embodiments, the magnitude of the compressive stress at this transition $C_{T1}$ may be from 75 MPa to 175 MPa for the compressive stress layer 1110*a*. In further embodiments, the magnitude of the compressive stress at this transition $C_{T2}$ may be from 100 MPa to 200 MPa for the compressive stress layer 1110*b*.

The differences between the properties of the compressive stress layer extending from different regions of the mounting surface may depend at least in part on the amount of material removed between the ion-exchange operations. The values given above are examples and are not intended to be limiting. In some cases, the residual compressive stress is measured over an area determined by the size of an optical element used in the stress measurement technique. In other embodiments, the residual compressive stress can be estimated from composition measurements in the ion-exchanged region.

In some embodiments, the properties of the compressive stress layer along each of the exterior surface and the interior surface may be similar to those at the second region of the mounting surface (e.g., where less or no material was removed). In embodiments, the depth of layer along the exterior surface and the depth of layer along the interior surface are each greater than the depth of layer along the first region of the mounting surface. For example, the depth of layer along the exterior surface and the interior surface each may be from 75 microns to 200 microns or from 100 microns to 150 microns. In additional embodiments, the surface compressive stress at each of the exterior surface and the interior surface is from 500 MPa to 850 MPa. In some embodiments, the depth of the compressive stress layer and the surface compressive stress at the exterior surface of the part may be slightly less than at the interior surface of the part due to incidental polishing of the exterior surface of the part. In embodiments, the depth of the compressive stress layer and the surface compressive stress at the exterior surface are within 5% or 2% of that at the interior surface.

As previously discussed, a cover for the electronic device may include multiple components, such as an ion-exchangeable cover component and other components such as a smudge-resistant or decorative coating. Although in some instances the description provided herein may simply refer to a cover, the description provided herein may also apply to an ion-exchangeable cover component such as a glass or glass ceramic cover. For example, the geometrical features of the ion-exchangeable cover may be at least similar to those described for the cover of the electronic device.

Figure 12:
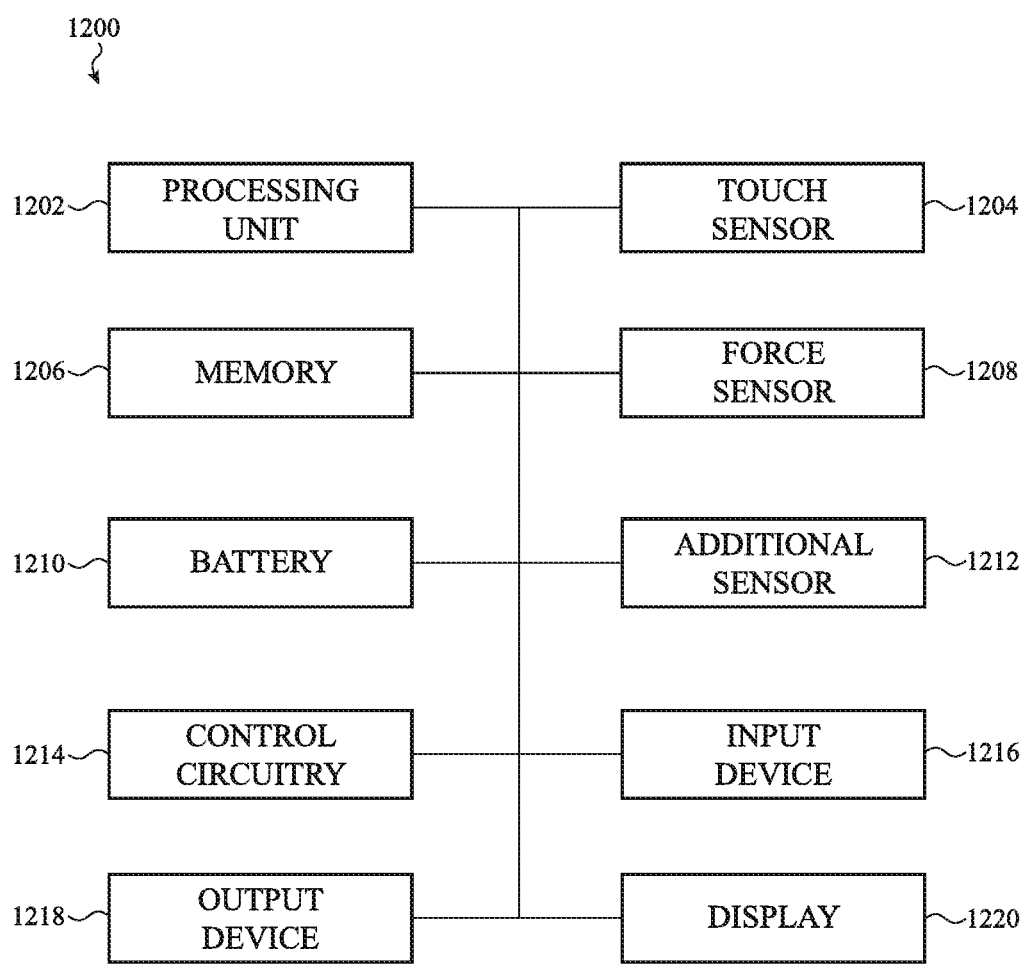
FIG. 12 depicts a block diagram of components for an electronic device.

FIG. 12 is a block diagram of example components of an example electronic device. The schematic representation depicted in FIG. 12 may correspond to components of the devices depicted in FIGS. 1A-11B, described above. However, FIG. 12 may also more generally represent other types of electronic devices including a chemically strengthened cover.

The electronic device 1200 also includes a processing unit 1202 (also referred to as a processor) operably connected with a computer-readable memory 1206. The processing unit 1202 may be operatively connected to the memory 1206 component via an electronic bus or bridge. The processing unit 1202 may be implemented as one or more computer processors or microcontrollers configured to perform operations in response to computer-readable instructions. The processing unit 1202 may include a central processing unit (CPU) of the device 1200. Additionally and/or alternatively, processing unit 1202 may include other electronic circuitry within the device 1200 including application specific integrated chips (ASIC) and other microcontroller devices. The processing unit 1202 may be configured to perform functionality described in the examples above.

The memory 1206 may include a variety of types of non-transitory computer-readable storage media, including, for example, read access memory (RAM), read-only memory (ROM), erasable programmable memory (e.g., EPROM and EEPROM), or flash memory. The memory 1202 is configured to store computer-readable instructions, sensor values, and other persistent software elements.

The electronic device 1200 may include control circuitry 1214. The control circuitry 1206 may be implemented in a single control unit and not necessarily as distinct electrical circuit elements. As used herein, "control unit" will be used synonymously with "control circuitry." The control circuitry 1214 may receive signals from the processing unit 1202 or from other elements of the electronic device 1200.

As shown in FIG. 12, the electronic device 1200 includes a battery 1210 that is configured to provide electrical power to the components of the electronic device 1200. The battery 1210 may include one or more power storage cells that are linked together to provide an internal supply of electrical power. The battery 1210 may be operatively coupled to power management circuitry that is configured to provide appropriate voltage and power levels for individual components or groups of components within the electronic device 1200. The battery 1210, via power management circuitry, may be configured to receive power from an external source, such as an alternating current power outlet. The battery 1210 may store received power so that the electronic device 1200 may operate without connection to an external power source for an extended period of time, which may range from several hours to several days.

In some embodiments, the electronic device 1200 includes one or more input devices 1216. The input device

1216 is a device that is configured to receive input from a user or the environment. The input device 1216 may include, for example, a push button, capacitive touch button, dial, crown, or the like. In some embodiments, the input device may provide a dedicated or primary function, including, for example, a power button, volume buttons, home buttons, scroll wheels, and camera buttons.

As shown in FIG. 12, the electronic device 1200 includes a touch sensor 1204 and a force sensor 1208. The touch sensor 1204 may be a touch-activated button or a touch screen (e.g., a touch-sensitive display or a force-sensitive display). The electronic device 1200 also includes one or more additional sensors 1212. For example, the sensors 1212 may be a force sensor, a capacitive sensor, an accelerometer, a barometer, a gyroscope, a magnetometer, a proximity sensor, a light sensor, or the like. The sensors 1212 may be operably coupled to processing circuitry. In some embodiments, the sensors 1212 may detect deformation and/or changes in configuration of the electronic device and be operably coupled to processing circuitry which controls the display based on the sensor signals. In addition, the sensors 1212 may include a microphone, acoustic sensor, light sensor, optical facial recognition sensor, or other types of sensing device.

In some embodiments, the electronic device 1200 includes one or more output devices 1218 configured to provide output to a user. The output device 1218 may include a display 1220 that renders visual information generated by the processing unit 1202. The output device 1218 may also include one or more speakers to provide audio output.

The display 1220 may include a liquid-crystal display (LCD), light-emitting diode (LED) display, organic light-emitting diode (OLED) display, an active layer organic light emitting diode (AMOLED) display, organic electroluminescent (EL) display, electrophoretic ink display, or the like. If the display 1220 is a liquid-crystal display or an electrophoretic ink display, the display may also include a backlight component that can be controlled to provide variable levels of display brightness. If the display 1220 is an organic light-emitting diode or organic electroluminescent type display, the brightness of the display 1220 may be controlled by modifying the electrical signals that are provided to display elements. In addition, information regarding configuration and/or orientation of the electronic device 1200 may be used to control the output of the display 1220 as described with respect to input devices 1216.

The electronic device 1200 may also include a communication port that is configured to transmit and/or receive signals or electrical communication from an external or separate device. The communication port may be configured to couple to an external device via a cable, adaptor, or other type of electrical connector. In some embodiments, the communication port may be used to couple the electronic device 1200 to a host computer.

The electronic device 1200 may also include at least one accessory, such as a camera, a flash for the camera, or other such device. The camera may be connected to other parts of the electronic device 1200 such as the control circuitry 1214.

As used herein, the terms "about," "approximately," "substantially," "substantially continuously," "substantially uniform," and the like are used to account for relatively small variations, such as a variation of +/− 10%, +/− 5%, or +/− 2%.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device, comprising:
an enclosure component defining a first mounting surface;
a display; and
a glass cover positioned over the display and comprising:
  a central portion;
  a flange at least partially surrounding the central portion, and defining:
    a first segment extending along a first side of the central portion and defining a first region of a second mounting surface;
    a second segment extending along a second side of the central portion and defining a second region of the second mounting surface; and
    a corner segment extending from the first segment to the second segment and defining a third region of the second mounting surface; and
  a compressive stress layer having:
    a first depth at the first region;
    a second depth, greater than the first depth, at the second region; and
    a third depth, greater than the first depth, at the third region.

2. The electronic device of claim 1, wherein a height of the first segment is less than a height of the corner segment.

3. The electronic device of claim 1, wherein a length of the second segment is less than a length of the first segment.

4. The electronic device of claim 1, wherein a surface compressive stress of the third region is greater than a surface compressive stress of the first region.

5. The electronic device of claim 1, wherein the compressive stress layer comprises:
a surface zone extending from the first, the second, and the third regions of the first mounting surface to a depth from 10 to 50 microns; and
an internal zone extending from the surface zone.

6. An electronic device, comprising:
a strengthened glass cover comprising:
  a central portion;
  a mounting surface at least partially surrounding the central portion and comprising:
    a first region extending along a first side of the strengthened glass cover;
    a second region extending along a second side of the strengthened glass cover; and a third region extending from the first region and the second region and along a corner of the strengthened glass cover; and a compressive stress layer having:
a first depth at a first location in the first region of the mounting surface;
a second depth, greater than the first depth, at a second location in the second region of the mounting surface; and
a third depth, greater than the first depth, at a third location in the third region of the mounting surface; and a display positioned below the strengthened glass cover.

7. The electronic device of claim 6, wherein:
the strengthened glass cover further comprises a peripheral portion at least partially surrounding the central portion; and
the mounting surface is defined along the peripheral portion.

8. The electronic device of claim 7, wherein a bend region is defined along the peripheral portion and extends from the central portion to the mounting surface.

9. The electronic device of claim 6, wherein:
the strengthened glass cover further comprises a flange extending at an angle from the central portion; and
the first region, the second region, and the third region of the mounting surface are defined by the flange.

10. The electronic device of claim 6, wherein a surface compressive stress at the third location in the third region is greater than a surface compressive stress at the first location in the first region.

11. The electronic device of claim 6, wherein:
the central portion comprises an exterior surface and an interior surface opposite the exterior surface;
the compressive stress layer defines, at the first location in the first region of the mounting surface:
a first surface zone; and
a first internal zone having a first thickness;
the compressive stress layer defines, at the second location in the second region of the mounting surface:
a second surface zone; and
a second internal zone having a second thickness greater than the first thickness;
the compressive stress layer defines, at the third location in the third region of the mounting surface:
a third surface zone; and
a third internal zone having a third thickness greater than the first thickness; and
the compressive stress layer defines, along the exterior surface of the central portion:
a fourth surface zone; and
a fourth internal zone having a fourth thickness greater than the first thickness.

12. The electronic device of claim 11, wherein the compressive stress layer defines, along the interior surface of the central portion:
a fifth surface zone; and
a fifth internal zone having a fifth thickness greater than the first thickness.

13. A method comprising:
placing a glass cover in a first ion-exchange bath to form a first ion-exchanged layer, the glass cover defining:
a central portion; and
a mounting surface at least partially surrounding the central portion, the mounting surface comprising:
a first region extending along a first side of the glass cover;
a second region extending along a second side of the glass cover; and
a third region extending from the first region and the second region and along a corner of the glass cover;
removing the glass cover from the first ion-exchange bath;
removing material from the first region of the mounting surface, thereby locally reducing a depth of the first ion-exchanged layer along the first region of the mounting surface;
placing the glass cover in a second ion-exchange bath to form a second ion-exchanged layer within the first ion-exchanged layer, the operations of placing the glass cover in the first ion-exchange bath and in the second ion-exchange bath producing a compressive stress layer along the mounting surface, the compressive stress layer having:
a first depth along the first region of the mounting surface;
a second depth, greater than the first depth, along the second region of the mounting surface; and
a third depth, greater than the first depth, along the third region of the glass cover; and
removing the glass cover from the second ion-exchange bath.

14. The method of claim 13, wherein an amount of material removed from the first region of the mounting surface is greater than an amount of material removed from the third region of the mounting surface.

15. The method of claim 14, wherein:
material is removed from the first region and the third region.

16. The method of claim 14, wherein the depth of the first ion-exchanged layer is locally reduced at the first region of the mounting surface by 10 microns to 50 microns.

17. The method of claim 13, wherein:
a base composition of the glass cover comprises first alkali metal ions;
the first ion-exchanged layer comprises second alkali metal ions introduced from the first ion-exchange bath;
the second ion-exchanged layer comprises third alkali metal ions introduced from the second ion-exchange bath; and
the compressive stress layer comprises a surface zone and an internal zone, the surface zone is enriched in the third alkali metal ions with respect to the internal zone, and the internal zone is enriched in the second alkali metal ions with respect to the base composition.

18. The method of claim 17, wherein the first alkali metal ions are lithium ions, the second alkali metal ions are sodium ions, and the third alkali metal ions are potassium ions.

* * * * *